(12) United States Patent
Khanania

(10) Patent No.: US 12,222,102 B2
(45) Date of Patent: Feb. 11, 2025

(54) BURNER ASSEMBLY AND SYSTEMS INCORPORATING A BURNER ASSEMBLY

(71) Applicant: Souhel Khanania, Coppell, TX (US)

(72) Inventor: Souhel Khanania, Coppell, TX (US)

(*) Notice: Subject to any disclaimer, the term of this patent is extended or adjusted under 35 U.S.C. 154(b) by 0 days.

(21) Appl. No.: 17/825,717

(22) Filed: May 26, 2022

(65) Prior Publication Data

US 2022/0282863 A1 Sep. 8, 2022

Related U.S. Application Data

(63) Continuation of application No. 16/022,390, filed on Jun. 28, 2018, now Pat. No. 11,346,549, which is a continuation-in-part of application No. 15/388,941, filed on Dec. 22, 2016, now abandoned, and a continuation-in-part of application No. 15/388,796, filed on Dec. 22, 2016, now Pat. No. 11,346,548.

(60) Provisional application No. 62/271,838, filed on Dec. 28, 2015, provisional application No. 62/271,834, filed on Dec. 28, 2015.

(51) Int. Cl.
| | | |
|---|---|---|
| *F23D 14/02* | (2006.01) | |
| *F23D 14/58* | (2006.01) | |
| *F23D 23/00* | (2006.01) | |
| *A47J 27/21* | (2006.01) | |

(52) U.S. Cl.
CPC ........... *F23D 14/02* (2013.01); *F23D 14/583* (2013.01); *F23D 23/00* (2013.01); *A47J 27/21166* (2013.01)

(58) Field of Classification Search
None
See application file for complete search history.

(56) References Cited

U.S. PATENT DOCUMENTS

| | | |
|---|---|---|
| 1,127,899 A | 2/1915 | Koppitz et al. |
| 1,630,309 A | 5/1927 | Pitman |
| 1,991,631 A | 2/1935 | Sangster |
| 2,212,905 A | 8/1940 | Tota |
| 2,243,661 A | 5/1941 | Tota |
| 2,290,784 A | 7/1942 | Turpin |
| 2,429,360 A | 10/1947 | Kells |

(Continued)

FOREIGN PATENT DOCUMENTS

| | | |
|---|---|---|
| CH | 106654 A | 10/1924 |
| CN | 205402820 U | 7/2016 |

(Continued)

OTHER PUBLICATIONS

Office Action dated Jul. 19, 2022; U.S. Appl. No. 16/732,967, filed Jan. 2, 2020; 34 pages.

(Continued)

*Primary Examiner* — Jason Lau
(74) *Attorney, Agent, or Firm* — Conley Rose, P.C.; J. Robert Brown, Jr.

(57) ABSTRACT

Systems and methods are disclosed that include providing a cooking system that comprises a burner assembly and a heat exchanger, the burner assembly having a high velocity burner configured to provide the necessary high velocity, volumetric flowrate through the heat exchanger, and the burner assembly also having a low velocity burner configured to significantly reduce and/or substantially eliminate "lift off" that could result from operation of only the high velocity burner.

20 Claims, 15 Drawing Sheets

(56) References Cited

U.S. PATENT DOCUMENTS

| | | | |
|---|---|---|---|
| 2,533,143 | A | 12/1950 | Scharbau et al. |
| 2,666,427 | A | 1/1954 | Keating |
| 2,788,848 | A | 4/1957 | Furczyk |
| 2,824,604 | A | 2/1958 | Reed |
| 3,002,553 | A | 10/1961 | Reed |
| 3,065,741 | A | 11/1962 | Gerard |
| 3,333,123 | A | 7/1967 | Baumann |
| 3,351,041 | A | 11/1967 | Watson et al. |
| 3,483,920 | A | 12/1969 | Heyn et al. |
| 3,773,019 | A | 11/1973 | Hapgood |
| 3,782,118 | A | 1/1974 | Butter et al. |
| 3,831,560 | A | 8/1974 | Kuhnlein |
| 3,843,313 | A | 10/1974 | Helgeson |
| 3,850,571 | A | 11/1974 | Zink et al. |
| 3,990,433 | A | 11/1976 | Keating |
| 4,020,189 | A | 4/1977 | Wright et al. |
| 4,202,182 | A | 5/1980 | Kawashima et al. |
| 4,253,821 | A | 3/1981 | Bradshaw |
| 4,373,504 | A | 2/1983 | Day |
| 4,466,482 | A | 8/1984 | Dorazio et al. |
| 4,475,587 | A | 10/1984 | Vasiliev et al. |
| 4,615,895 | A | 10/1986 | Bhattacharjee |
| 4,702,693 | A | 10/1987 | Frailoi |
| 4,786,247 | A | 11/1988 | Bhattacharjee |
| 4,825,846 | A | 5/1989 | Frailoi |
| 4,858,592 | A | 8/1989 | Hayek et al. |
| 4,889,103 | A | 12/1989 | Frailoi |
| 4,980,187 | A | 12/1990 | Johnson |
| 5,137,740 | A | 8/1992 | Benson et al. |
| 5,209,218 | A | 5/1993 | Daneshvar et al. |
| 5,230,796 | A | 7/1993 | Ter Meulen |
| 5,251,693 | A | 10/1993 | Zifferer |
| 5,287,919 | A | 2/1994 | George, II et al. |
| 5,318,438 | A | 6/1994 | Sugahara et al. |
| 5,540,215 | A | 7/1996 | Fritzsche et al. |
| 5,690,166 | A | 11/1997 | Yamaguchi |
| 5,779,465 | A | 7/1998 | Clarke et al. |
| 5,901,641 | A | 5/1999 | McNamara |
| 6,103,118 | A | 8/2000 | Ter Meulen |
| 6,315,552 | B1 | 11/2001 | Haynes |
| 6,837,234 | B2 | 1/2005 | Rabas et al. |
| 7,040,385 | B2 | 5/2006 | Higashiyama |
| 7,303,777 | B2 | 12/2007 | Baas et al. |
| 9,074,765 | B2 | 7/2015 | Armanni |
| 11,346,548 | B2 | 5/2022 | Khanania |
| 11,346,549 | B2 | 5/2022 | Khanania |
| 2003/0034027 | A1* | 2/2003 | Yamamoto ......... A47J 37/1247 126/344 |
| 2004/0250810 | A1 | 12/2004 | Schultz et al. |
| 2005/0056270 | A1 | 3/2005 | Babington |
| 2005/0181102 | A1 | 8/2005 | Basker et al. |
| 2006/0177788 | A1 | 8/2006 | Kang et al. |
| 2007/0042306 | A1 | 2/2007 | Bacon |
| 2007/0089732 | A1 | 4/2007 | Ricord et al. |
| 2007/0254254 | A1 | 11/2007 | Gehring et al. |
| 2008/0022994 | A1 | 1/2008 | Hutchinson et al. |
| 2009/0061369 | A1 | 3/2009 | Wang et al. |
| 2010/0012304 | A1 | 1/2010 | Lee et al. |
| 2010/0081098 | A1 | 4/2010 | D'Agostini et al. |
| 2010/0139885 | A1 | 6/2010 | Hoffman et al. |
| 2011/0287154 | A1 | 11/2011 | Resser et al. |
| 2012/0121771 | A1 | 5/2012 | Jones |
| 2013/0025546 | A1 | 1/2013 | Okamoto et al. |
| 2013/0213385 | A1 | 8/2013 | O'Donnell et al. |
| 2013/0260323 | A1 | 10/2013 | Hong et al. |
| 2013/0312700 | A1 | 11/2013 | Oda |
| 2014/0080072 | A1 | 3/2014 | Smirnov et al. |
| 2014/0165991 | A1 | 6/2014 | Noman et al. |
| 2015/0128926 | A1 | 5/2015 | Noman et al. |
| 2017/0131034 | A1 | 5/2017 | Ribarov et al. |
| 2017/0184304 | A1 | 6/2017 | Khanania |
| 2020/0245803 | A1 | 8/2020 | Khanania |

FOREIGN PATENT DOCUMENTS

| | | | |
|---|---|---|---|
| DE | 102008055981 | A1 | 5/2010 |
| EP | 0859199 | B1 | 10/2004 |
| EP | 2160966 | A1 | 3/2010 |
| GB | 599536 | A | 3/1948 |
| GB | 934339 | A | 8/1963 |
| GB | 1311752 | A | 3/1973 |
| GB | 2032611 | A | 5/1980 |
| JP | 6792643 | A | 6/1982 |
| JP | 2000253838 | A | 9/2000 |
| JP | 2004308945 | A | 11/2004 |
| JP | 2005061688 | A | 3/2005 |
| JP | 2006132826 | A | 5/2006 |
| JP | 2021083558 | A | 6/2021 |
| WO | 9617672 | A1 | 6/1996 |
| WO | 2015085098 | A1 | 6/2015 |

OTHER PUBLICATIONS

Australian Office Action; Application No. 2019295701; Aug. 3, 2022; 4 pages.
Notice of Allowance dated Feb. 22, 2023; U.S. Appl. No. 16/732,967, filed Jan. 2, 2020; 24 pages.
Mexican Office Action; Application No. MX/a/2018/007951; Aug. 10, 2022; 5 pages.
Khanania, Souhel; U.S. Appl. No. 17/840,226; filed Jun. 14, 2022; Title: Cooking System and Heat Exchanger; 85 pages.
Khanania, Souhel; U.S. Appl. No. 17/840,229; filed Jun. 14, 2022; Title: Cooking System and Vessel; 83 pages.
Office Action dated May 28, 2019; U.S. Appl. No. 15/388,796, filed Dec. 22, 2016; 32 pages.
Office Action dated Jan. 8, 2020; U.S. Appl. No. 15/388,796, filed Dec. 22, 2016; 16 pages.
Final Office Action dated Sep. 4, 2020; U.S. Appl. No. 15/388,796, filed Dec. 22, 2016; 21 pages.
Advisory Action dated Feb. 2, 2021; U.S. Appl. No. 15/388,796, filed Dec. 22, 2016; 8 pages.
Office Action dated Jun. 17, 2021; U.S. Appl. No. 15/388,796, filed Dec. 22, 2016; 21 pages.
Notice of Allowance dated Feb. 4, 2022; U.S. Appl. No. 15/388,796, filed Dec. 22, 2016; 21 pages.
Office Action dated Dec. 28, 2018; U.S. Appl. No. 15/388,941, filed Dec. 22, 2016; 29 pages.
Final Office Action dated Apr. 30, 2019; U.S. Appl. No. 15/388,941, filed Dec. 22, 2016; 20 pages.
Advisory Action dated Jul. 29, 2019; U.S. Appl. No. 15/388,941, filed Dec. 22, 2016; 3 pages.
Office Action dated Sep. 4, 2019; U.S. Appl. No. 15/388,941, filed Dec. 22, 2016; 18 pages.
Office Action dated Jan. 9, 2020; U.S. Appl. No. 16/022,390, filed Jun. 28, 2018; 37 pages.
Final Office Action dated Sep. 4, 2020; U.S. Appl. No. 16/022,390, filed Jun. 28, 2018; 19 pages.
Office Action dated Jul. 29, 2021; U.S. Appl. No. 16/022,390, filed Jun. 28, 2018; 27 pages.
Final Office Action dated Nov. 5, 2021; U.S. Appl. No. 16/022,390, filed Jun. 28, 2018; 13 pages.
Notice of Allowance dated Jan. 26, 2022; U.S. Appl. No. 16/022,390, filed Jun. 28, 2018; 5 pages.
Office Action dated Jul. 9, 2021; U.S. Appl. No. 16/732,967, filed Jan. 2, 2020; 29 pages.
Final Office Action dated Feb. 15, 2022; U.S. Appl. No. 16/732,967, filed Jan. 2, 2020; 46 pages.
PCT International Search Report; Application No. PCT/US2016/068358; Apr. 14, 2017; 3 pages.
PCT Written Opinion of the International Searching Authority; Application No. PCT/US2016/068358; Apr. 14, 2017; 11 pages.
Australian Office Action; Application No. 2016380160; Sep. 20, 2021; 4 pages.
Australian Office Action; Application No. 2016380160; Mar. 4, 2022; 2 pages.

(56) References Cited

OTHER PUBLICATIONS

Australian Office Action; Application No. 2016380160; Mar. 31, 2022; 2 pages.
Brazilian Office Action; Application No. 1120180133108; Published in IP Gazette May 19, 2020; 6 pages.
European Extended Search Report; Application No. 16882436.5; Aug. 6, 2019; 7 pages.
European Examination Report; Application No. 16882436.5; Feb. 26, 2021; 4 pages.
European Examination Report; Application No. 16882436.5; Feb. 11, 2022; 4 pages.
Mexican Office Action; Application No. MX/a/2018/007951; May 19, 2022; 4 pages.
PCT International Search Report; Application No. PCT/US2016/068383; Mar. 30, 2017; 3 pages.
PCT Written Opinion of the International Searching Authority; Application No. PCT/US2016/068383; Mar. 30, 2017; 8 pages.
European Extended Search Report; Application No. 16882441.5; Aug. 19, 2019; 12 pages.
PCT International Search Report & Written Opinion of the International Searching Authority; Application No. PCT/US2019/039271; Oct. 18, 2019; 11 pages.
Australian Office Action; Application No. 2019295701; Nov. 17, 2021; 5 pages.
European Extended Search Report; Application No. 19825728.9; Feb. 11, 2022; 7 pages.
Khanania, Souhel; U.S. Appl. No. 18/195,169; filed May 9, 2023; Title: Cooking System with Burner Assembly and Heat Exchanger; 44 pages.
Khanania, Souhel; U.S. Appl. No. 18/446,250; filed Aug. 8, 2023; Title: Cooking System and Heat Exchanger with Combustion Chamber; 69 pages.
Brazilian Office Action; Application No. 112020026760-0; Jun. 8, 2023; 6 pages.
PCT International Search Report & Written Opinion of the International Searching Authority; Application No. PCT/US2023/023516; Sep. 18, 2023; 10 pages.
PCT International Search Report & Written Opinion of the International Searching Authority; Application No. PCT/US2023/023514; Sep. 12, 2023; 11 pages.
European Examination Report; Application No. 19825728.9; Dec. 8, 2023; 4 pages.
Mexican Office Action; Application No. MX/a/2021/000181; Apr. 16, 2024; 5 pages.
Mexican Office Action; Application No. MX/a/2021/000181; Jul. 9, 2024; 6 pages.

* cited by examiner

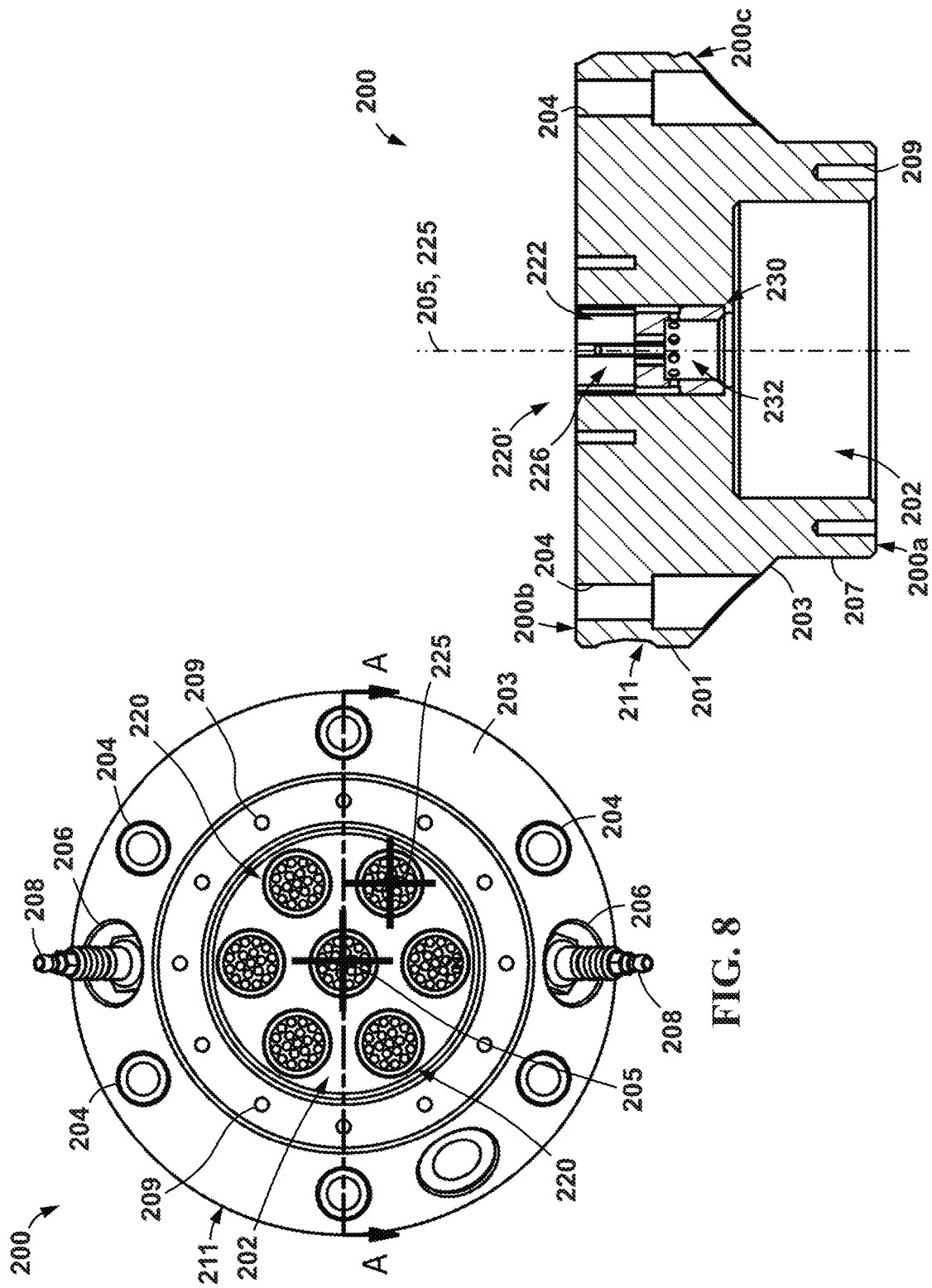

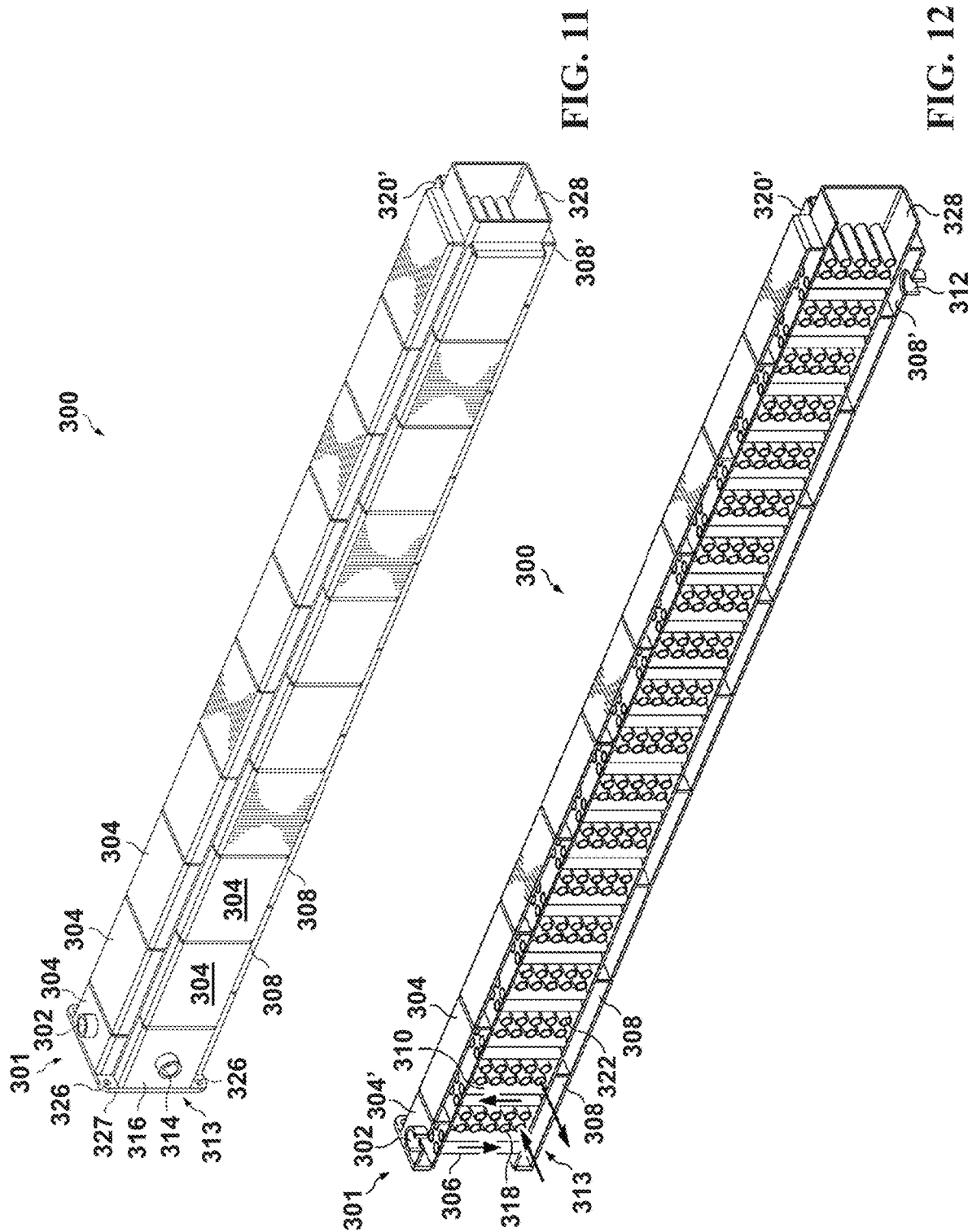

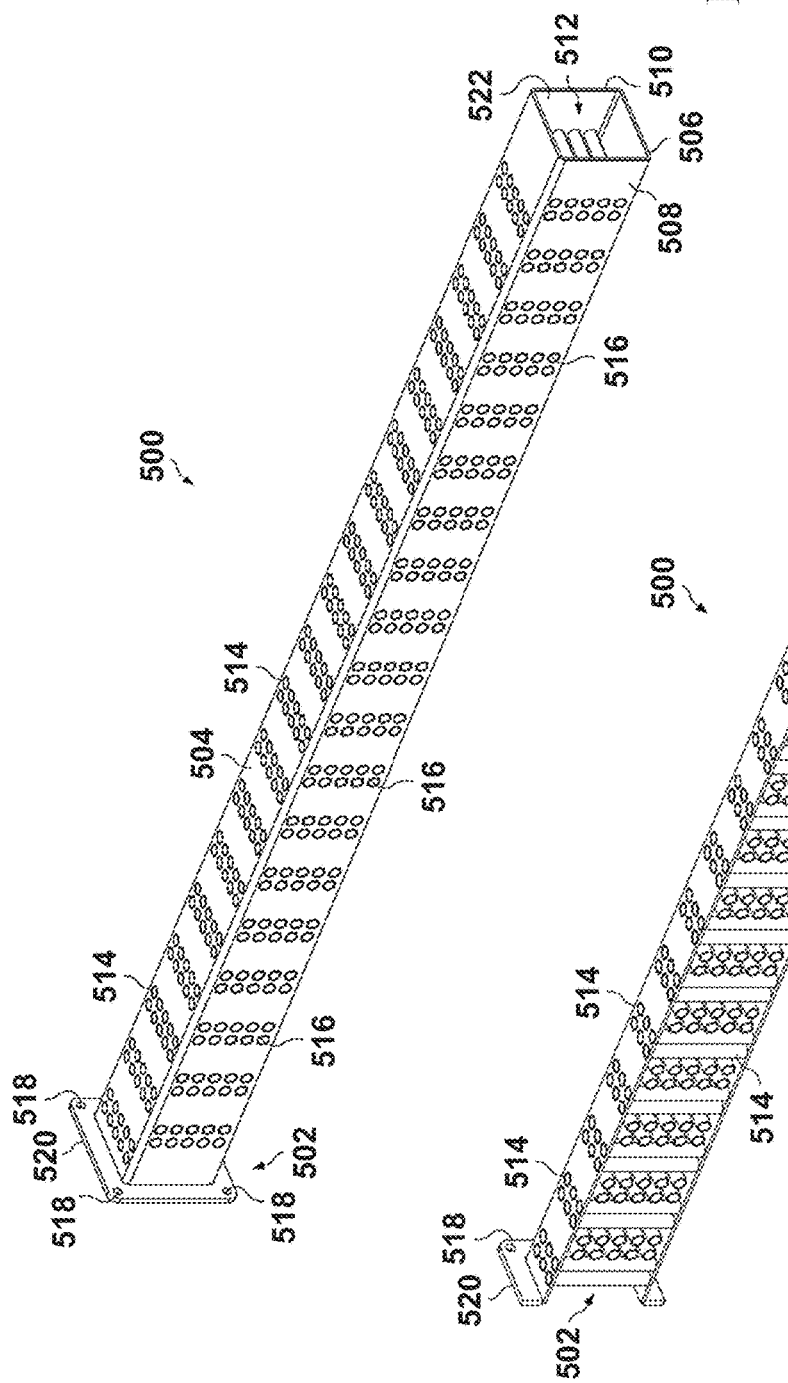

BURNER ASSEMBLY AND SYSTEMS INCORPORATING A BURNER ASSEMBLY

CROSS-REFERENCE TO RELATED APPLICATIONS

This application is a continuation of U.S. patent application Ser. No. 16/022,390 filed Jun. 28, 2018, and entitled "Burner Assembly and Systems Incorporating a Burner Assembly", which is a continuation-in-part of U.S. patent application Ser. No. 15/388,796, filed Dec. 22, 2016, and entitled "Burner Assembly and Heat Exchanger," which further claims priority to U.S. Provisional Patent Application No. 62/271,834 filed on Dec. 28, 2015 and entitled "Burner Assembly and Heat Exchanger," the disclosures of each being hereby incorporated by reference in their entireties. U.S. patent application Ser. No. 16/022,390 is also a continuation-in-part of U.S. patent application Ser. No. 15/388,941, filed Dec. 22, 2016, and entitled "Burner Assembly and Heat Exchanger," which further claims priority to U.S. Provisional Patent Application No. 62/271,838 filed on Dec. 28, 2015, and entitled "Burner Assembly and Heat Exchanger," the disclosures of each being hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Food service equipment often includes heat generation equipment and/or heat transfer equipment to produce and/or transfer heat to a cooking medium contained in a cooking vessel for cooking consumables prior to packaging. Such heat generation equipment and/or heat transfer equipment often includes a burner configured to combust an air/fuel mixture to produce heat and a heat exchanger to transfer the heat produced by the burner to the cooking medium. Traditional food service burners and/or heat exchangers may often be inefficient at transferring heat to the cooking medium and/or require frequent monitoring and/or replacement of the cooking medium.

SUMMARY

Some embodiments disclosed herein are directed to a burner including a body that defines a first cavity, and a burner coupled to the body that is configured to combust an air/fuel mixture. The burner has a central axis and includes a first sub-burner in fluid communication with the first cavity that is configured to combust the air/fuel mixture at a first flowrate, and a second sub-burner in fluid communication with the first cavity that is configured to combust the air/fuel mixture at a second flowrate. The second flowrate is lower than the first flowrate. The burner assembly also includes an igniter configured to ignite the air/fuel mixture in each of the first sub-burner and the second sub-burner. In some embodiments, the second sub-burner is circumferentially disposed about the first sub-burner with respect to the central axis. In some embodiments, the burner further includes a combustion chamber in fluid communication with each of the first sub-burner and the second sub-burner. In some embodiments, the first sub-burner includes a plurality of axially extending first bores in fluid communication with each of the first cavity and the combustion chamber, and the second sub-burner includes a plurality of radially extending second bores in fluid communication with each of the first cavity and the combustion chamber. In some embodiments, the body further includes an upstream end and a downstream end, wherein the first cavity extends from the upstream end, and the burner extends from the first cavity to the downstream end. In some embodiments, the burner includes a burner bore extending through the body from the downstream end to the first cavity, and an insert disposed within the burner bore, wherein the insert includes each of the plurality of first bores and the plurality of second bores. In an embodiment, the combustion chamber is defined by the burner bore, between the insert and the downstream end. In some embodiments, the insert also comprises a second cavity that is in fluid communication with each of the plurality of first bores, the plurality of second bores, and the first cavity, wherein each of the plurality of first bores has a smaller diameter than the second cavity.

Other embodiments disclosed herein are directed to a burner assembly including a body that defines a first cavity, and a plurality of burners coupled to the body, each burner being configured to combust an air/fuel mixture. Each burner has a central axis and includes a first sub-burner in fluid communication with the first cavity that is configured to combust the air/fuel mixture at a first flowrate, and a second sub-burner in fluid communication with the first cavity that is configured to combust the air/fuel mixture at a second flowrate. The second flowrate is lower than the first flowrate. The burner assembly also includes an igniter configured to ignite the air/fuel mixture in the first sub-burner and the second sub-burner in each of the plurality of burners. In some embodiments, each burner further includes a combustion chamber in communication with each of the first sub-burner and the second sub-burner. In some embodiments the burner assembly further includes a plurality of slots, wherein the combustion chamber of each of the burners is in fluid communication with the combustion chambers of each of the other burners through the plurality of slots. In some embodiments, the central axis of each of the plurality of burners is parallel to the central axis of each of the other burners, and each of the slots extend radially with respect to the central axis of at least one of the burners. In some embodiments, for each burner the second sub-burner is circumferentially disposed about the first sub-burner with respect to the central axis. In some embodiments the first sub-burner comprises a plurality of axially extending first bores in fluid communication with the first cavity, and the second sub-burner of each burner comprises a plurality of radially extending second bores in communication with the first cavity. In some embodiments, the body further includes an upstream end and a downstream end, wherein the first cavity extends from the upstream end, and each of the plurality of burners extends from the first cavity to the downstream end. In some embodiments each of the plurality of burners includes a burner bore extending through the body from the downstream end to the first cavity, and an insert disposed within the burner bore, wherein the insert comprises each of the plurality of first bores and the plurality of second bores, and a second cavity, the second cavity is in fluid communication with the plurality of first bores, the plurality of second bores, and the first cavity, and each of the plurality of first bores has a smaller diameter than the second cavity.

Still other embodiments disclosed herein are directed to a cooking system including a first burner assembly comprising a body and a burner coupled to the body, the burner having a central axis and being configured to combust a first air/fuel mixture. The burner includes a first sub-burner in fluid communication with a first cavity defined by the body and configured to combust the first air/fuel mixture at a first flowrate, and a second sub-burner in fluid communication with the first cavity that is configured to combust the first air/fuel mixture at a second flowrate, the second flowrate being lower than the first flowrate. In addition, the cooking system includes a first heat exchanger comprising a fluid duct that is configured to receive the combusted air/fuel mixture from the first sub-burner and the second sub-burner. In some embodiments, the cooking system also includes a cooking vessel configured to receive a cooking fluid and a food item to perform a cooking reaction, wherein the first heat exchanger is configured to provide the cooking fluid to the cooking vessel, and a thermal oxidizer fluidly coupled to the cooking vessel, the thermal oxidizer is configured to receive an exhaust emitted from the cooking reaction, and the thermal oxidizer comprises a second burner assembly that is configured to combust a second air/fuel mixture to increase a temperature of the exhaust. The second burner assembly includes a second body and a second burner coupled to the second body, the second burner having a central axis and being configured to combust a second air/fuel mixture, wherein the second burner further includes third sub-burner in fluid communication with a second cavity defined by the second body and configured to combust the second air/fuel mixture at a third flowrate and a fourth sub-burner in fluid communication with the second cavity that is configured to combust the second air/fuel mixture at a fourth flowrate, the fourth flowrate being lower than the first flowrate. In some embodiment, the cooking system also includes a second heat exchanger comprising a fluid duct that is configured to receive the exhaust from the thermal oxidizer. In some embodiments, the second heat exchanger is configured to increase the temperature of the cooking fluid to a first temperature and emit the cooking fluid to the first heat exchanger, and first heat exchanger is configured to increase the temperature of the cooking fluid from the first temperature to a second temperature.

BRIEF DESCRIPTION OF THE DRAWINGS

For a more complete understanding of the present disclosure and the advantages thereof, reference is now made to the following brief description, taken in connection with the accompanying drawings and detailed description:

FIG. 8 is a bottom view of the burner assembly of FIGS. 6 and 7 according to according to an embodiment of the disclosure;

FIG. 9 is a cross-sectional view of the burner assembly of FIGS. 6-8 taken along section A-A in FIG. 8 according to an embodiment of the disclosure;

FIG. 11 is an oblique side view of a heat exchanger according to an embodiment of the disclosure;

FIG. 12 is an oblique cross-sectional side view of the heat exchanger of FIG. 11 according to an embodiment of the disclosure;

FIG. 16 is an oblique side view of a heat exchanger according to an embodiment of the disclosure;

FIG. 17 is an oblique cross-sectional side view of the heat exchanger of FIG. 6 according to an embodiment of the disclosure;

DETAILED DESCRIPTION

Figure 1:
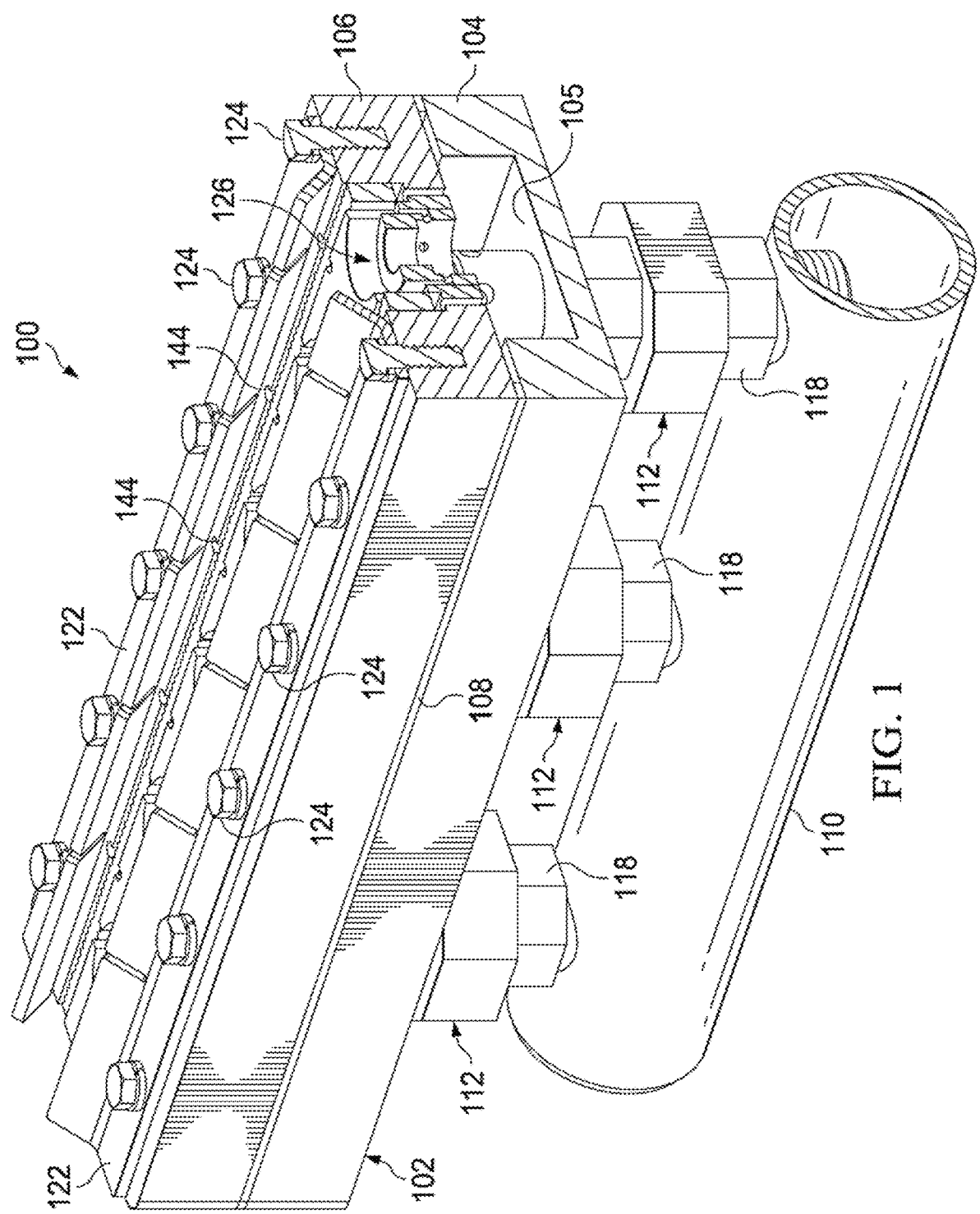
FIG. 1 is an oblique side view showing a partial cross-section of a burner assembly according to an embodiment of the disclosure.
Figure 2:
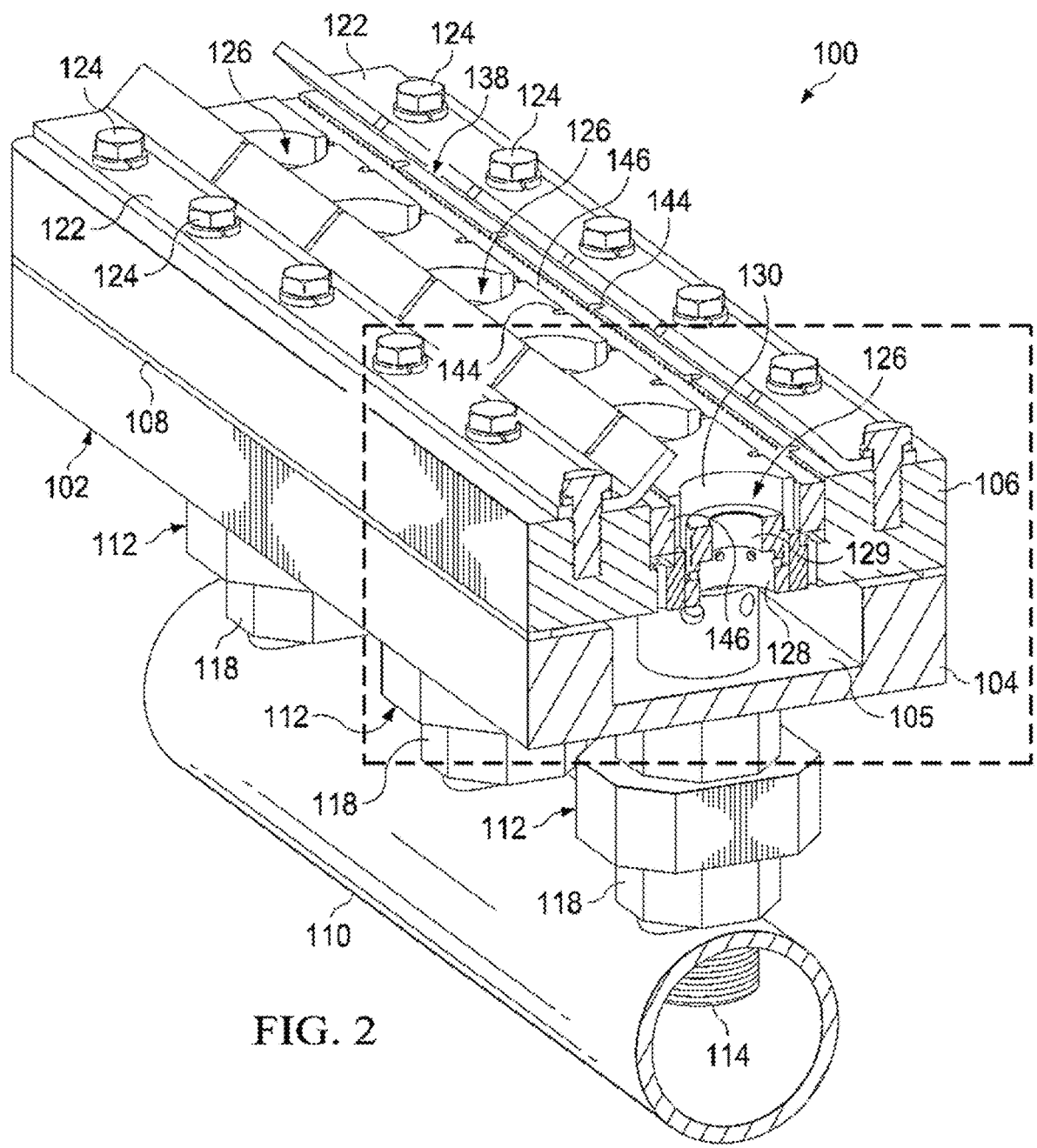
FIG. 2 is an oblique front view showing the partial cross-section of the burner assembly of FIG. 1 according to an embodiment of the disclosure.
Figure 3:
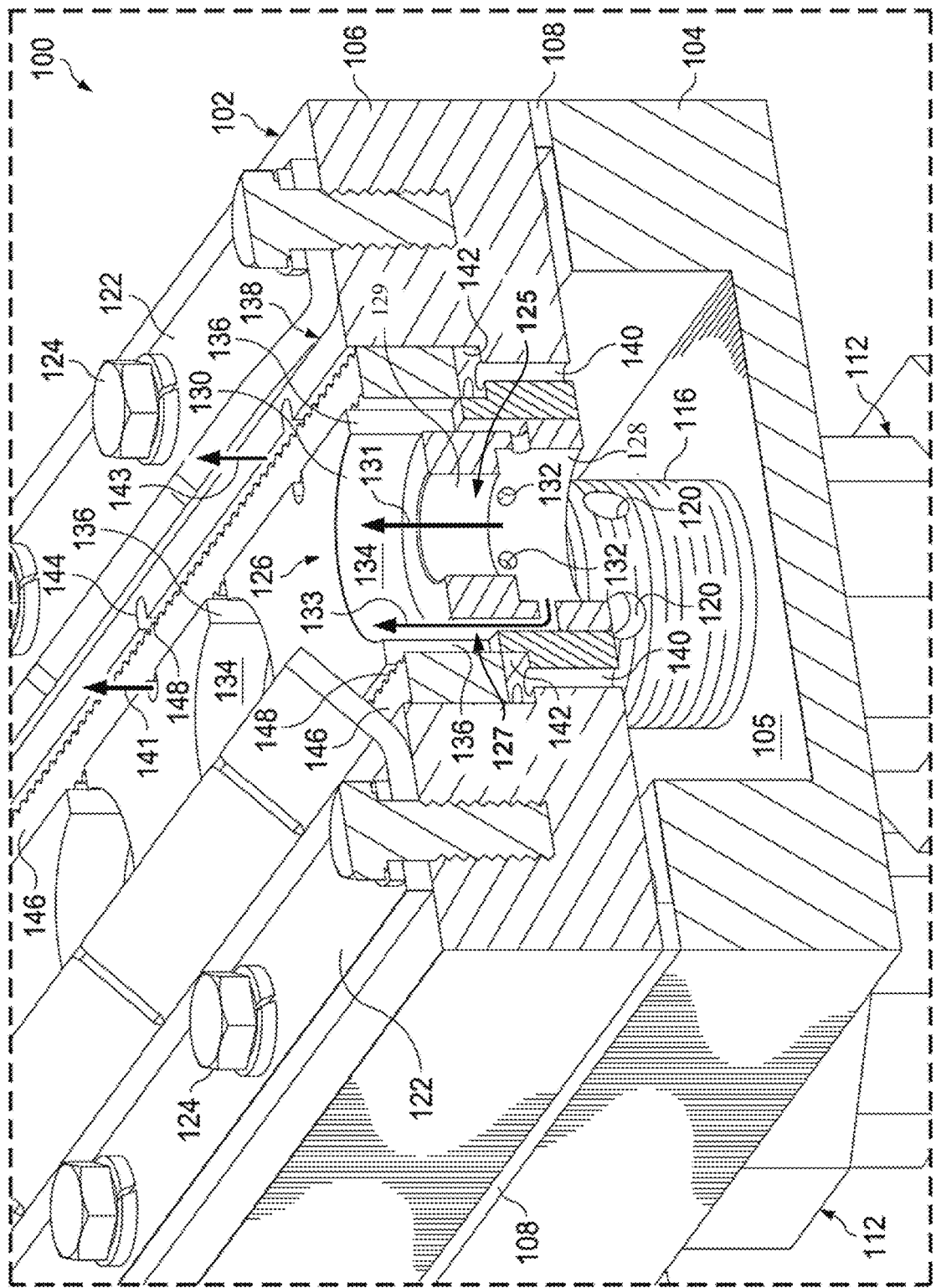
FIG. 3 is a detailed oblique front view of the partial cross-section of the burner assembly of FIGS. 1-2 according to an embodiment of the disclosure.
Figure 4:
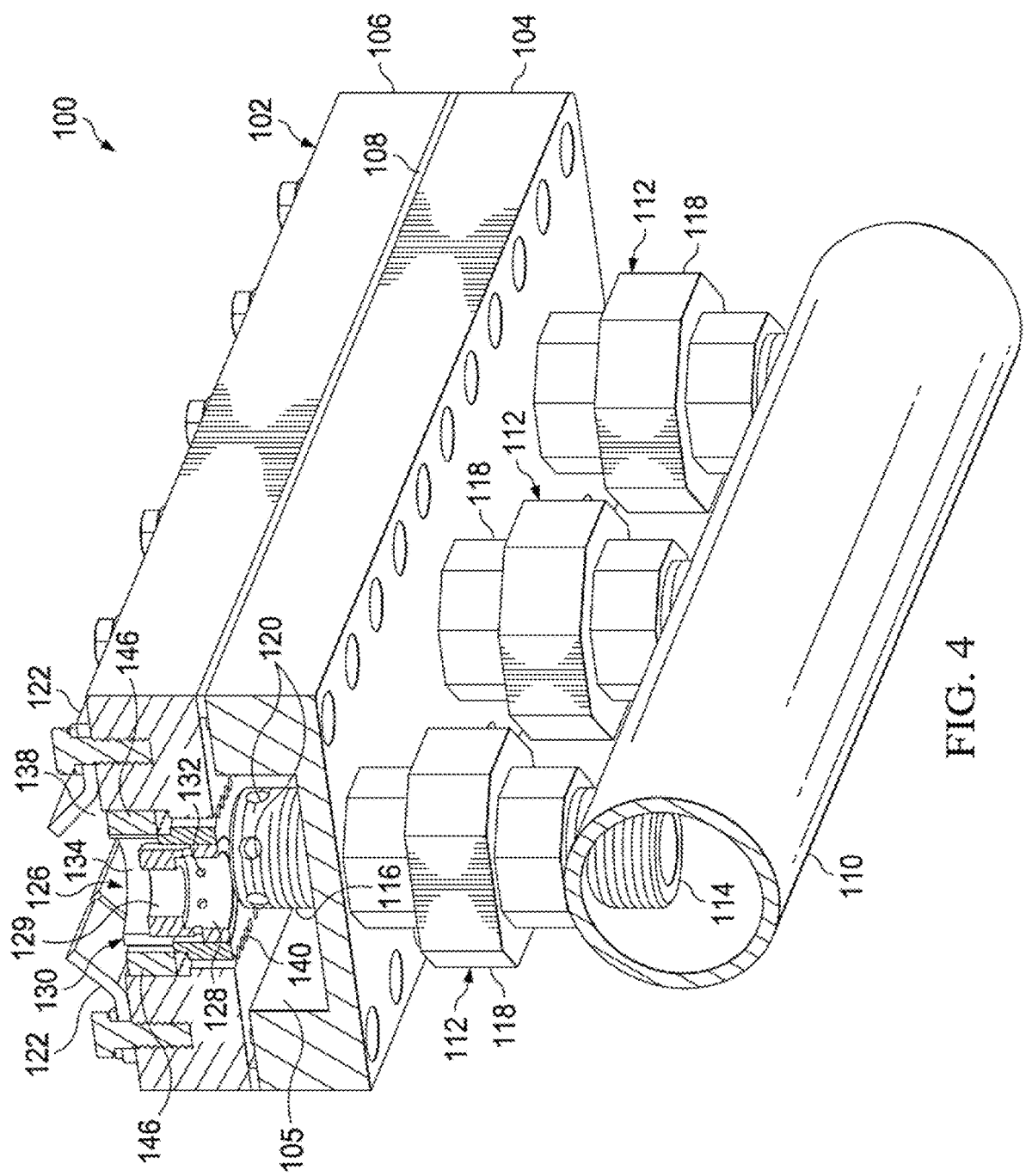
FIG. 4 is an oblique bottom view showing the partial cross-section of the burner assembly of FIGS. 1-3 according to an embodiment of the disclosure.
Figure 5:
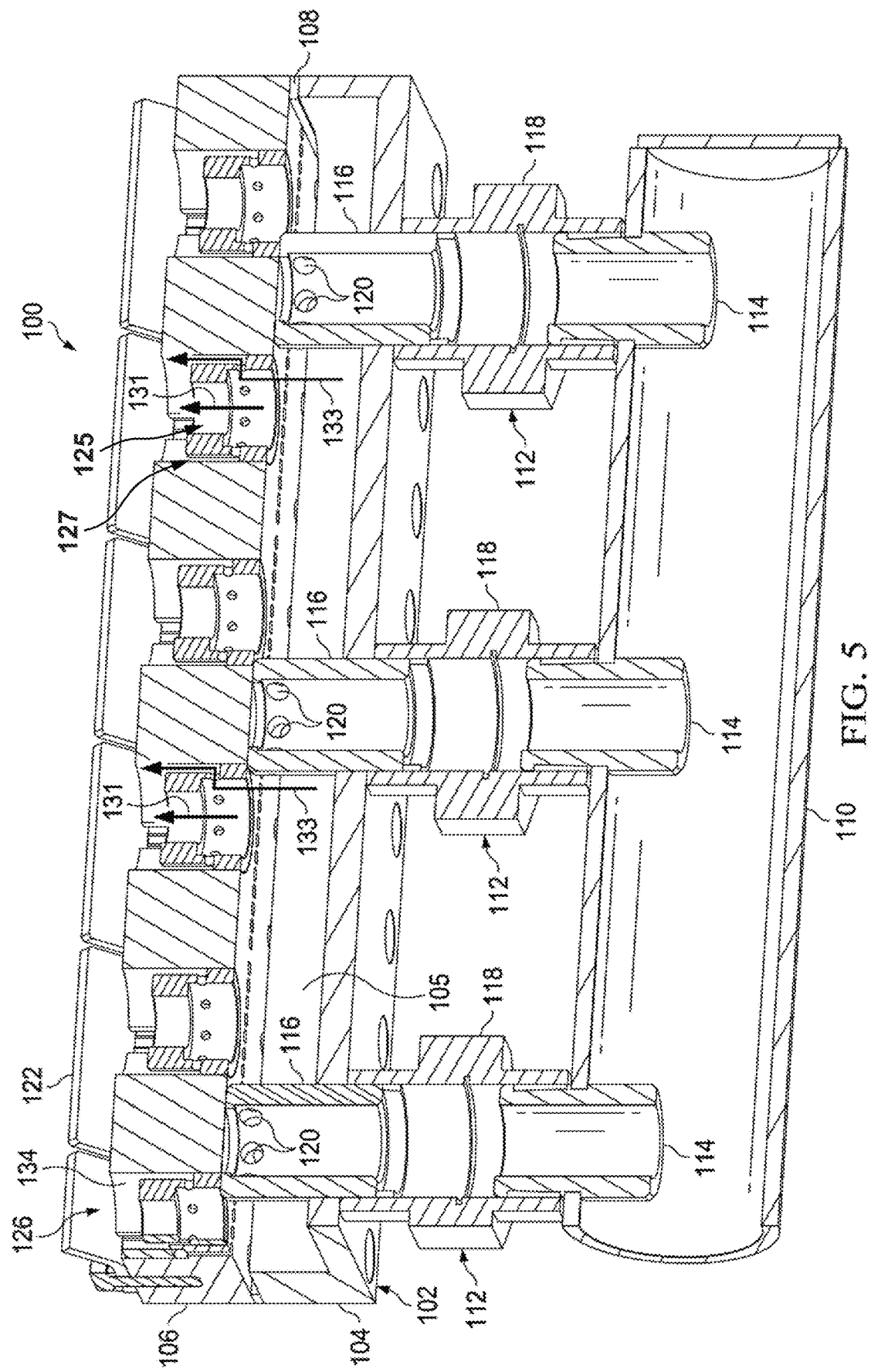
FIG. 5 is an oblique cross-sectional right side view showing the partial cross-section of the burner assembly of FIGS. 1-4 according to an embodiment of the disclosure.

In some cases, it may be desirable to provide a cooking system with a burner assembly having a high velocity burner to force combusted air and fuel through a heat exchanger and a low velocity burner to maintain a continuous combustion process and prevent so-called "lift off" where a flame and/or combustion process may be extinguished by a high velocity combustion process that exceeds the ignition capabilities of the burner. For example, a heat exchanger may comprise a plurality of compactly-arranged tubes comprising a plurality of fluid circuits. Alternatively, a heat exchanger may be submerged in a cooking vessel and comprise a plurality of compactly-arranged, interstitially-spaced vertical and horizontal tubes that are open to the cooking vessel to allow ingress and egress of a cooking fluid. In either of these example heat exchangers, resistance to fluid flow through a fluid duct of the heat exchanger may be excessive, such that traditional burners would fail to pass combusted air and fuel through the heat exchanger and would suffer from "lift off" if the velocity and/or flowrate of combustion was increased.

Accordingly, embodiments of cooking systems are disclosed herein that comprise one or more burner assemblies with a high velocity burner (or sub-burner) configured to provide the necessary high velocity flowrate through the tubes of a heat exchanger (e.g., whether the tubes are arranged in multiple fluid circuits of compactly-arranged tubes disposed perpendicularly and interstitially to one another, or whether the tubes comprise compactly-arranged and interstitially-spaced vertical and horizontal tubes that are open to the cooking vessel to allow ingress and egress of a cooking fluid). In addition, the burner assemblies also include a low velocity burner (or sub-burner) configured to significantly reduce and/or substantially eliminate "lift off" that could result from operation of only the high velocity burner.

Referring now to FIGS. 1-5, various views of a burner assembly 100 are shown according to an embodiment of the disclosure. The burner assembly 100 generally comprises a body 102, a manifold 110, a plurality of runners 112 joining the body 102 to the manifold 110, a plurality of first burners 126, a plurality of second burners 138, a ribbon burner 146, and a plurality of deflectors 122. The body 102 comprises a lower portion 104 joined to an upper portion 106. In some embodiments, the lower portion 104 may be bolted to the upper portion 106 using fasteners 124 disposed through holes in the lower portion 104 and threaded into the upper portion 106. In some embodiments, a gasket 108 may be disposed between the lower portion 104 and the upper portion 106 of the body 102 to prevent leakage and/or seepage of any fluid flowing within the cavity 105 from escaping between the lower portion 104 and the upper portion 106. When assembled, the lower portion 104 and the upper portion 106 generally form a cavity 105 through which fuel and/or an air/fuel mixture may flow.

The burner assembly 100 also comprises a manifold 110 configured to deliver the fuel and/or the air/fuel mixture into the cavity 105 through a plurality of parallel runners 112. Each runner 112 comprises a lower threaded portion 114, an upper threaded portion 116, and a butt joint 118 that joins the lower threaded portion 114 to the upper threaded portion 116. In some embodiments, it will be appreciated that each runner 112 may be a solid piece and comprise the lower threaded portion 114 and the upper threaded portion 116 joined by the butt joint 118. The lower threaded portion 114 may generally be threaded into and extend into an inner opening of the manifold 110, such that fuel and/or an air/fuel mixture may flow from an internal volume of the manifold 110 through an internal volume of the lower threaded portion 114 and into an internal volume of the butt joint 118. The upper threaded portion 116 may generally be threaded into the lower portion 104 of the body 102 and extend into the cavity 105 of the body 102. Accordingly, an internal volume of the upper threaded portion 116 may receive fuel and/or an air/fuel mixture from the internal volume of the butt joint 118. It will be appreciated that each runner 112 thus comprises a fluid flow path that extends through internal volumes of the lower threaded portion 114, the butt joint 118, and the upper threaded portion 116. Furthermore, the upper threaded portion 116 comprises a plurality of fuel delivery holes 120 that may distribute the fuel and/or the air/fuel mixture received from the manifold 110 evenly throughout the cavity 105. Additionally, in some embodiments, an upper distal end of the upper threaded portion 116 may be closed and/or substantially abut a substantially flat surface of the upper portion 106 of the body 102 so that the fuel and/or the air/fuel mixture that passes through the runner 112 only escapes the upper threaded portion 116 through the fuel delivery holes 120.

The burner assembly 100 comprises a plurality of first burners 126 arranged adjacently along a length of the upper portion 106 of burner assembly 100. Additionally, the plurality of first burners 126 are arranged along a centerline of the upper portion 106 of the body 102, such that the centerline of the body 102 intersects a center axis of each first burner 126. Each first burner 126 comprises a cylindrically-shaped first bore 128 configured to receive the fuel and/or the air/fuel mixture from the cavity 105. The first bore 128 also comprises a plurality of holes 132 disposed about the first bore 128 that are configured to allow the fuel and/or the air/fuel mixture to flow from the first bore 128 to a combustion chamber 134 that is formed by a cylindrically-shaped third bore 130. Each first burner 126 also comprises a cylindrically-shaped second bore 129 that is axially aligned with and disposed downstream from the first bore 128 with respect to the flow of the fuel and/or the air/fuel mixture through the burner assembly 100 and that comprises a diameter that is smaller than the diameter of the first bore 128. The second bore 129 may also receive the fuel and/or the air/fuel mixture from the first bore 128. In some embodiments, the smaller diameter of the second bore 129 may be sized to control a pressure drop through the second bore 129 and/or the plurality of holes 132 disposed about the first bore 128.

Accordingly, the first burner 126 may define a first flow path 131 from the cavity 105 through the first bore 128 and the second bore 129 into the combustion chamber 134 and further define a plurality of second flow paths 133 from the cavity 105 through the first bore 128, through the plurality of holes 132, and into the combustion chamber 134. Furthermore, as will be discussed herein in further detail, to ignite the fuel and/or the air/fuel mixture in the first burner 126, each first burner 126 also comprises a groove 136 disposed in the third bore 130 that forms the cylindrically-shaped combustion chamber 134 on each of an opposing left side and right side of the combustion chamber 134 so that fuel through the first flow path 131 and the plurality of second flow paths 133 of the first burner 126 may be ignited by the ribbon burner 146. Thus, the first burner 126 may further define a first sub-burner 125 in fluid communication with the cavity 105 via the first flow path 131, and a second sub-burner 127 in fluid communication with the cavity 105 via the second flow paths 133. The second sub-burner 127 extends circumferentially about the first sub-burner 125 with respect to a central axis of burner 126 (not shown).

In some embodiments, the flowrate, velocity, and/or volume of the fuel and/or the air/fuel mixture through the first flow path 131 of the first burner 126 may be greater than the flowrate, volume, and/or volume of the fuel and/or the air/fuel mixture through the plurality of second flow paths 133 through the first burner 126. In particular, without being limited to any particular theory, the radial flow of fluids along second flowpaths 133 causes impact of the fluids with the inner walls of third bore 130, thereby reducing the kinetic energy for these fluid flows and decreasing their velocity as compared to the fluids flowing through first flow path 131. As a result, the first sub-burner 125 (including flow path 131) may be referred to herein as a "high velocity sub-burner" and second sub-burner 127 (including flow path 133) may be referred to herein as a "low velocity sub-burner". However, it should be appreciated that in other embodiments, the flowrate and/or volume of the fuel and/or the air/fuel mixture through the first flow path 131 of the first burner 126 (i.e., through the first sub-burner 125 and the second sub-burner 127) may be equal to or less than the flowrate and/or volume of the fuel and/or the air/fuel mixture through the plurality of second flow paths 133 through the first burner 126. This adjustment of the relative velocities of flow paths 131, 133 may be accomplished by, for example, adjusting the sizes (e.g., diameters) of the first bore 128 and holes 132.

The burner assembly 100 also comprises a plurality of second burners 138 disposed on each of a left side and a right side of the upper portion 106 of the body 102 of burner assembly 100. Each second burner 138 may generally be configured as a low flow-rate ribbon burner 146 that comprises a plurality of feeder holes 140, a cavity 142, and a plurality of upper holes 144. The feeder holes 140 are configured to receive the fuel and/or the air/fuel mixture from the cavity 105 and allow the fuel and/or the air/fuel mixture to flow into a cavity 142 that houses the ribbon burner 146. The second burner 138 also comprises a plurality of upper holes 144 that are disposed on the left and right sides of the cavity 142 and the ribbon burner 146. The upper holes 144 receive fuel and/or the air/fuel mixture from the cavity 142. Accordingly, the second burner 138 may define a first flowpath 141 from the cavity 105 through a plurality of feeder holes 140, into the cavity 142, and through a plurality of upper holes 144. Furthermore, as will be discussed herein in further detail, the fuel and/or the air/fuel mixture flowing through the upper holes 144 may be ignited by the ribbon burner 146.

Additionally, the ribbon burner 146 comprises a plurality of small perforations 148 that may also allow fuel and/or the air/fuel mixture to pass through a plurality of second flowpaths 143 from the cavity 142 through the perforations 148, where they may be ignited by the ribbon burner 146. In some embodiments, the flowrate and/or volume of the fuel and/or the air/fuel mixture through the first flowpath 141 of the second burner 138 may be greater than the flowrate and/or volume of the fuel and/or the air/fuel mixture through the plurality of second flowpaths 143 through the second burner 138. However, in other embodiments, the flowrate and/or volume of the fuel and/or the air/fuel mixture through the first flowpath 141 of the second burner 138 may be equal to or less than the flowrate and/or volume of the fuel and/or the air/fuel mixture through the plurality of second flowpaths 143 through the second burner 138. Additionally, in some embodiments, the combined flowrate and/or volume of the fuel and/or the air/fuel mixture through a first burner 126 may be greater than the flowrate and/or volume of the fuel and/or the air/fuel mixture through a second burner 138. However, in alternative embodiments, the combined flowrate and/or volume of the fuel and/or the air/fuel mixture through a first burner 126 may be equal to or less than the flowrate and/or volume of the fuel and/or the air/fuel mixture through a second burner 138.

In some embodiments, the burner assembly 100 may comprise one or more infrared burners. Accordingly, the first burner 126, the second burner 138, and/or the ribbon burner 146 may be configured as an infrared burner. Accordingly, first burner 126, the second burner 138, and/or the ribbon burner 146 may comprise additional components, including but not limited to, ceramic components and/or other components necessary to configure and/or operate the first burner 126, the second burner 138, and/or the ribbon burner 146 as an infrared burner. However, in some embodiments, the first burner 126, the second burner 138, and/or the ribbon burner 146 may alternatively be configured as any other suitable burner.

In operation, the burner assembly 100 is configured to combust fuel and/or an air/fuel mixture through a plurality of first burners 126 and a plurality of second burners 138. In some embodiments, the burner assembly 100 may also comprise a separate igniter and/or a plurality of igniters configured to ignite the air/fuel mixture in each of the first burners 126 and the second burners 138. In this embodiment, the combined flowrate and/or volume of the fuel and/or air/fuel mixture through the first burners 126 is greater than the flowrate and/or volume of the fuel and/or the air/fuel mixture through the plurality of second burners 138. Accordingly, the velocity of the combusted fuel and/or the combusted air/fuel mixture through the first burners 126 is higher than the velocity of the combusted fuel and/or the combusted air/fuel mixture through the second burners 138.

Because the velocity of the combusted fuel and/or combusted air/fuel mixture through the first burners 126 exits the first burners 126 at such a high velocity, traditional burners may experience so-called "lift off" where the flame is extinguished due to the high velocity. As such, the lower velocity of the combusted fuel and/or the combusted air/fuel mixture exiting the second burners 138 may prevent this "lift off" by continuously burning fuel at a lower flowrate and/or delivering a combusted air/fuel mixture at the lower velocity. Additionally, the burner assembly 100 also comprises a deflector 122 on each of a left side and a right side of the upper portion 106 of the body 102 of burner assembly 100 that is secured to the upper portion 106 of the body 102 by a plurality of fasteners 124. The deflectors 122 may be angled towards a center of the upper portion 106 and extend over the second burners 138 in order to deflect the combusted air/fuel mixture exiting the second burners 138 towards the combusted air/fuel mixture exiting the first burners 126. Accordingly, the deflectors 122 may also aid in preventing "lift off" by directing the lower velocity combusted air/fuel mixture exiting the second burners 138 towards the higher velocity combusted air/fuel mixture exiting the first burners 126.

Further, within the first burner 126 itself, the velocity of the combusted fuel and/or the fuel mixture through the first sub-burner 125 may be such that the first sub-burner 125 may also experience "lift off." However, the relatively slower velocity of the combusted fluid flow from second sub-burner 127 may prevent this "lift off" of the first sub-burner 125 by continuously burning fuel at a lower flow rate and/or delivering combusted fuel or fuel/air mixture at a lower velocity.

Figure 7:
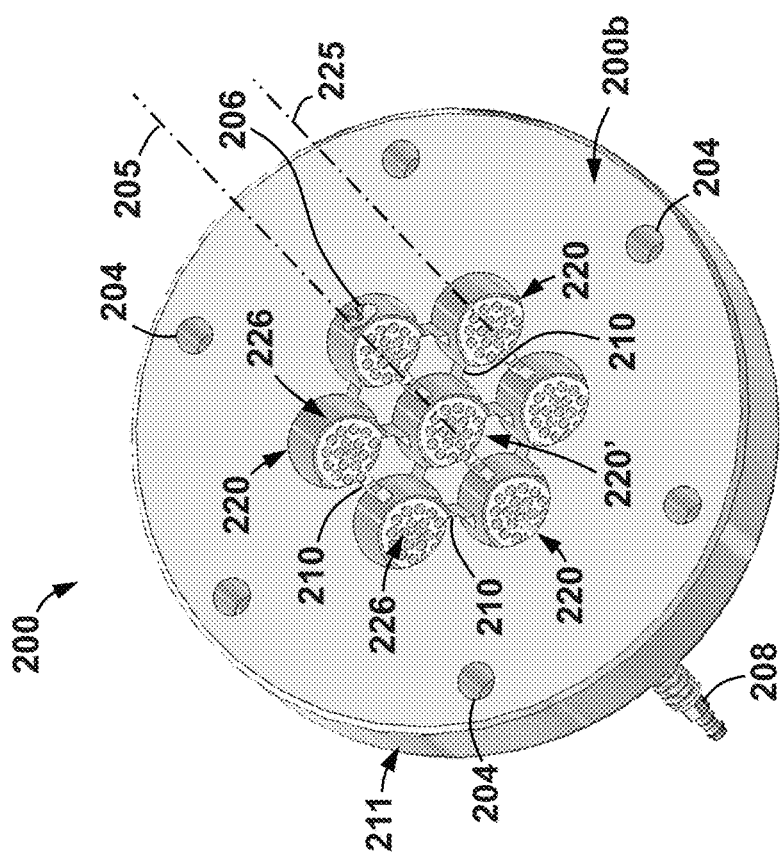
FIGS. 6 and 7 are perspective views of a burner assembly according to an embodiment of the disclosure.
Figure 6:
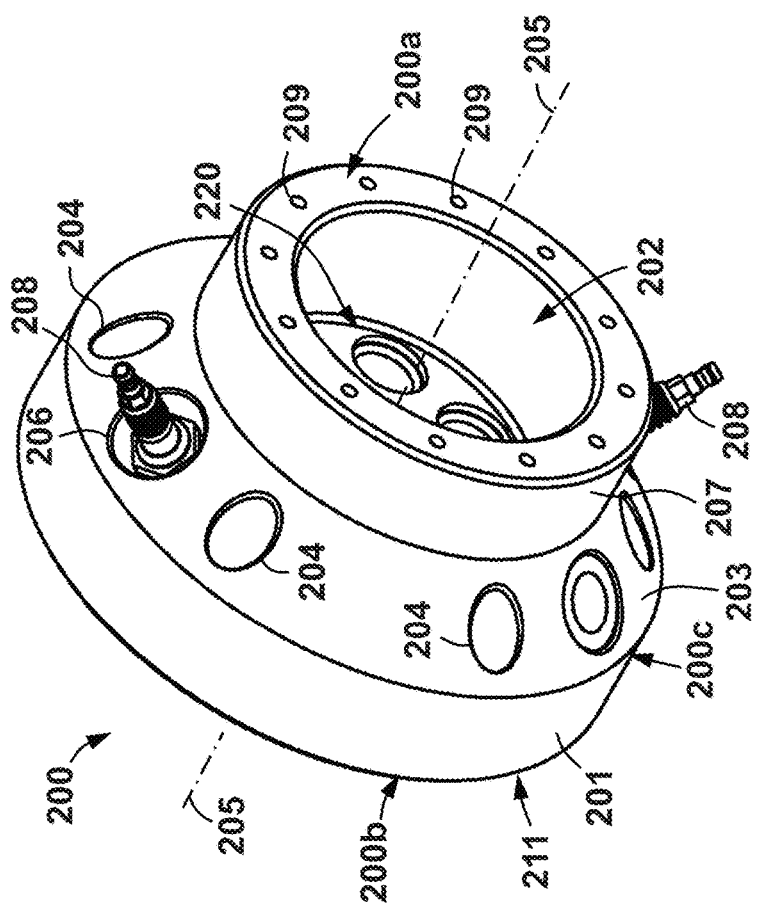

Referring now to FIGS. 6-8, a pair of perspective views and a back view of a burner assembly 200 is shown according to an embodiment of the disclosure. Burner assembly 200 comprises a generally cylindrical body 211 that includes a central axis 205, a first or upstream end 200a, a second or downstream end 200b opposite upstream end 200a, and a radially outer surface 200c extending axially between ends 200a, 200b. Radially outer surface 200c further includes a first upstream cylindrical surface 207 extending from upstream end 200a, a second or downstream cylindrical surface 201 extending axially from downstream end 200b, and a frustoconical surface 203 between surfaces 201, 207. In this embodiment, downstream cylindrical surface 201 has a larger diameter about axis 205 than upstream cylindrical surface 207 such that frustoconical surface 203 extends radially outward moving axially from upstream cylindrical surface 207 to downstream cylindrical surface 201. A plurality of mounting bores 204 extend axially from frustoconical surface 203 to downstream end 200b that are evenly circumferentially spaced about axis 205. As will be described in more detail below, mounting bores 204 are configured to receive bolts, screws, rivets, or other suitable mounting members to secure burner assembly 200 to another member or structure (e.g., a heat exchanger, vessel, etc.). In addition, a plurality of mounting bores 209 also extend into body 211 from upstream end 200a. Mounting bores 209 may be used to couple piping or other supply conduits to burner assembly 200 (e.g., such as to supply fuel or a fuel air mixture to burner assembly 200).

Body 211 of burner assembly 200 also includes a cylindrical recess or cavity 202 extending axially from upstream end 200a and a plurality of burners 220 extending axially from cavity 202 to downstream end 200b. As shown in FIGS. 7 and 8, each burner 220 has a central or longitudinal axis 225 that extends parallel to axis 205 of burner assembly 200. In this embodiment, burner assembly 200 includes a total of seven burners 220 with one of the burners (identified as burner 220') coaxially aligned with burner assembly 200 and the remaining six burners 220 evenly circumferentially spaced about axis 205. In particular, in this embodiment, axis 225 of central burner 220' is aligned with axis 205 of burner assembly 200, and the axes 225 of the remaining burners 220 are all parallel to and radially offset from axis 205 of burner assembly 200. It should be appreciated that generic references to burners 220 is meant to encompass all of the burners 220 on burner assembly 200 (including central burner 220').

Figure 10:
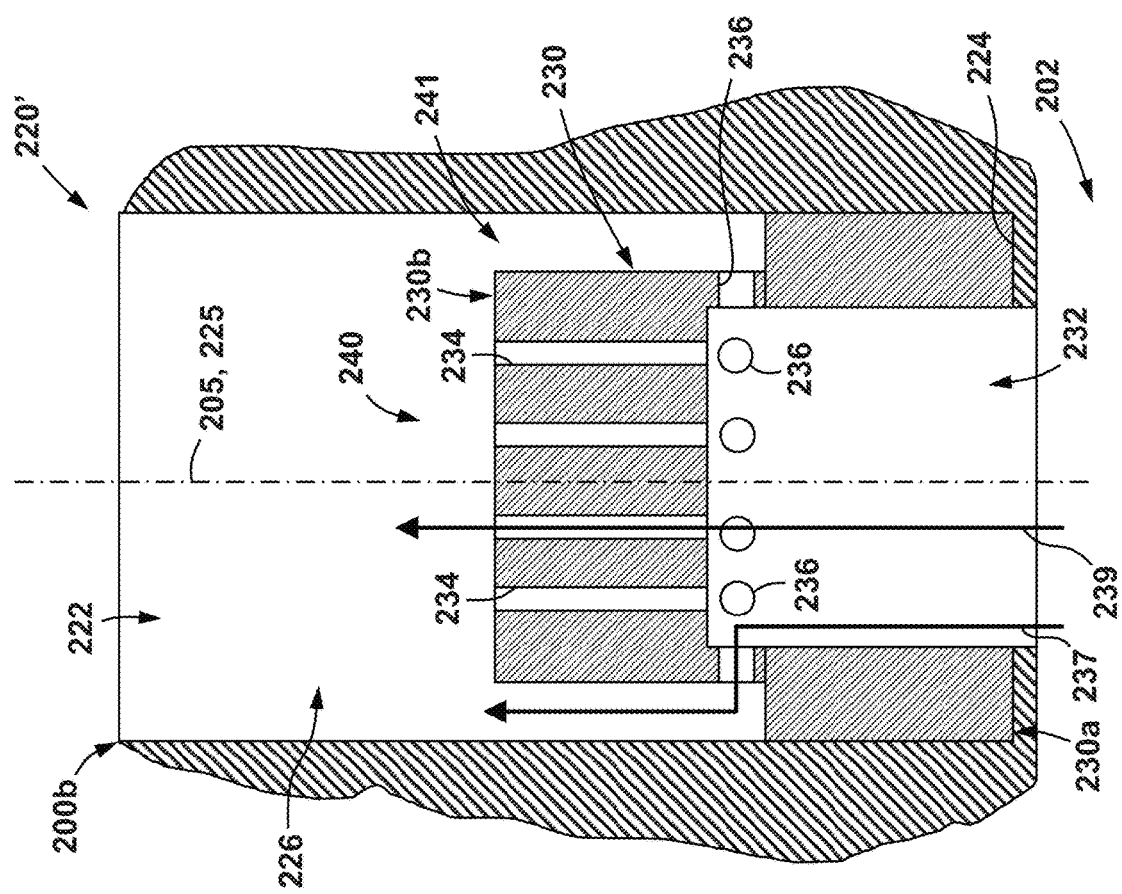
FIG. 10 is an enlarged side cross-sectional view of a portion of the burner assembly of FIGS. 6-9 according to an embodiment of the disclosure.

Referring now to FIGS. 9 and 10, cross-sectional views of burner assembly 200 and central burner 220' are shown. It should be appreciated that the details described below for burner 220' are also applicable to describe the features of the other burners 220, except that axis 225 of the remaining burners 220 are not aligned with axis 205 as previously described above. Thus, a detailed description of the other burners 220 is omitted herein in the interest of brevity.

In this embodiment, burner 220' comprises a bore 222 (bore 222 may be referred to herein as a "burner bore 222") extending axially from downstream end 200b of body 211 to cavity 202 and an insert 230 disposed within bore 222. Insert 230 is coaxially aligned with axis 225 and includes a first or upstream end 230a, a second or downstream end 230b opposite upstream end 230a, a recess or cavity 232 extending axially from upstream end 230a, a plurality of first bores 234 extending axially from cavity 232 to downstream end 230b, and a plurality of second bores 236 extending radially from cavity 232. As best shown in FIG. 10, insert 230 is disposed within bore 222 such that upstream end 230a engages or abuts with a radially extending annular shoulder 224 within bore 222 such that cavity 232 is in communication with cavity 202 of body 211. In addition, bore 222 and upstream end 200b of burner assembly 200 are in communication with cavity 232 (and thus also cavity 202) through each of the plurality of first bores 234 and the plurality of second bores 236.

Each burner 220' defines a plurality of first flow paths 239 extending from cavity 232, axially through bores 234 and into bore 222 toward downstream end 200b, and a plurality of second flow paths 237 extending from cavity 232 radially through bores 236 and then axially through bore 222 toward downstream end 200b. As will be described in more detail below, bore 222 (or the portion of bore 222 that is not occupied by insert 230) forms a combustion chamber 226 that receives fuel (or an air/fuel mixture) from both the first flow paths 239 and the second flow paths 237 that may be ignited therein. However, because the fuel (or air/fuel mixture) flowing through the plurality of second flow paths 237 first flows radially from cavity 232 into bore 222 (or combustion chamber 226), the fluids flowing along second flow paths 237 flow at a slower velocity (and thus at a lower flow rate) than the fluids flowing along plurality of first flow paths 239. In other words, without being limited to any particular theory, the radial flow of fluids along second flow paths 237 causes impact of the fluids with the inner wall of bore 222, thereby reducing the kinetic energy for these fluid flows and decreasing their velocity as compared to the fluids flowing axially through first flow paths 239. Also, the relatively smaller diameter of the bores 234 compared with cavity 232 causes an increase in velocity of the fluids flowing along flow paths 239 upon entering bores 234. As a result, burner 220' defines a first sub-burner 240 (or high velocity burner) fed by flow paths 239, and a second sub-burner 241 (or low velocity burner) fed by flow paths 237 (see FIG. 10). In particular, in this embodiment, second sub-burner 241 is annularly or circumferentially disposed about first sub-burner 240 with respect to axis 225.

In addition, the increased velocity through flow paths 239 due to the constrictions created within the relatively smaller diameter first bores 234 also allows for higher velocities of combusted fuel (or air/fuel mixture) through the first sub-burner 240 from relatively smaller flow rates of fuel (or fuel/air mixture) through cavity 202. This may further enhance the ability of burner assembly 200 to deliver a flow of combusted fluids at a sufficiently high velocity to overcome any back pressure imposed by the internal structure of an associated heat exchanger (e.g., heat exchangers 300, 500 described below).

Referring back now to FIGS. 6 and 7, a plurality of slots 210 extend through burner assembly 200 to place the combustion chambers 226 of adjacently disposed burners 220 in fluid communication with one another. As a result, in this embodiment, the combustion chambers 226 of all of the burners 220 on burner assembly 200 are in fluid communication with one another either directly or indirectly via the slots 210. Further, a pair of spark plugs 208 (or other suitable igniter member) are inserted partially into the combustion chambers 226 of two of the burners 220 (however, more or less than two spark plugs 208 may be used in other embodiments) through corresponding angled bores 206 extending from frustoconical surface 203. As a result, spark plugs 208 may be utilized to ignite fuel (or air/fuel mixture) disposed within combustion chambers 226 of burners 220.

Referring now to FIGS. 6, 7, and 10, in operation, burner assembly 200 is configured to combust fuel and/or an air/fuel mixture through the plurality of burners 220. Initial combustion (or ignition) of the fuel and/or air/fuel mixture within burners 220 is achieved via one or both of the spark plugs 208, and this initial combustion subsequently spreads to the other burners 220 via slots 210. Within each burner 220, the fuel and/or fuel mixture enters chamber 226 via sub-burners 240, 241 and ignites therein. In at least some operations, the velocity of the combusted fuel and/or combusted air/fuel mixture through the first-sub burners 240 is such that they may experience so-called "lift off" where the flame is extinguished due to the high velocity. However, the lower velocity of the combusted fuel and/or fuel/air mixture exiting second sub-burners 241 (which have a slower flow rate due to the radially directed bores 236 as previously described) may prevent this "lift off" by continuously burning fuel at a lower flowrate and/or delivering a combusted air/fuel mixture at a lower velocity. In addition, if any of the burners 220 should experience a total loss of combustion (e.g., due to "lift-off," temporary lack of fuel, or another reason), then the fluid communication between the burners 220 via slots 210 may allow for re-ignition from an adjacent burner 220 that is still combusting fuel therein.

Additionally, while not shown specifically in FIGS. 6-10, additional adjacent burners (e.g., ribbon burners 146 in FIG. 2) or deflectors (e.g., deflectors 122 in FIG. 2) may also be incorporated onto or adjacent to burner assembly 200 in the same or a similar manner to that described above for burner assembly 100, so that additional reliability may be achieved during operations with burner assembly 200. Further, as described above for burner assembly 100, in some embodiments, burner assembly 200 may comprise one or more infrared burners. Accordingly, the burners 220 (including sub-burners 240, 241) and/or the possible additional adjacent burners discussed above may comprise additional components including but not limited to, ceramic components and/or other components necessary to configured and/or operate burners 220 (or the additional adjacent burners) as infrared burners.

Figure 13:
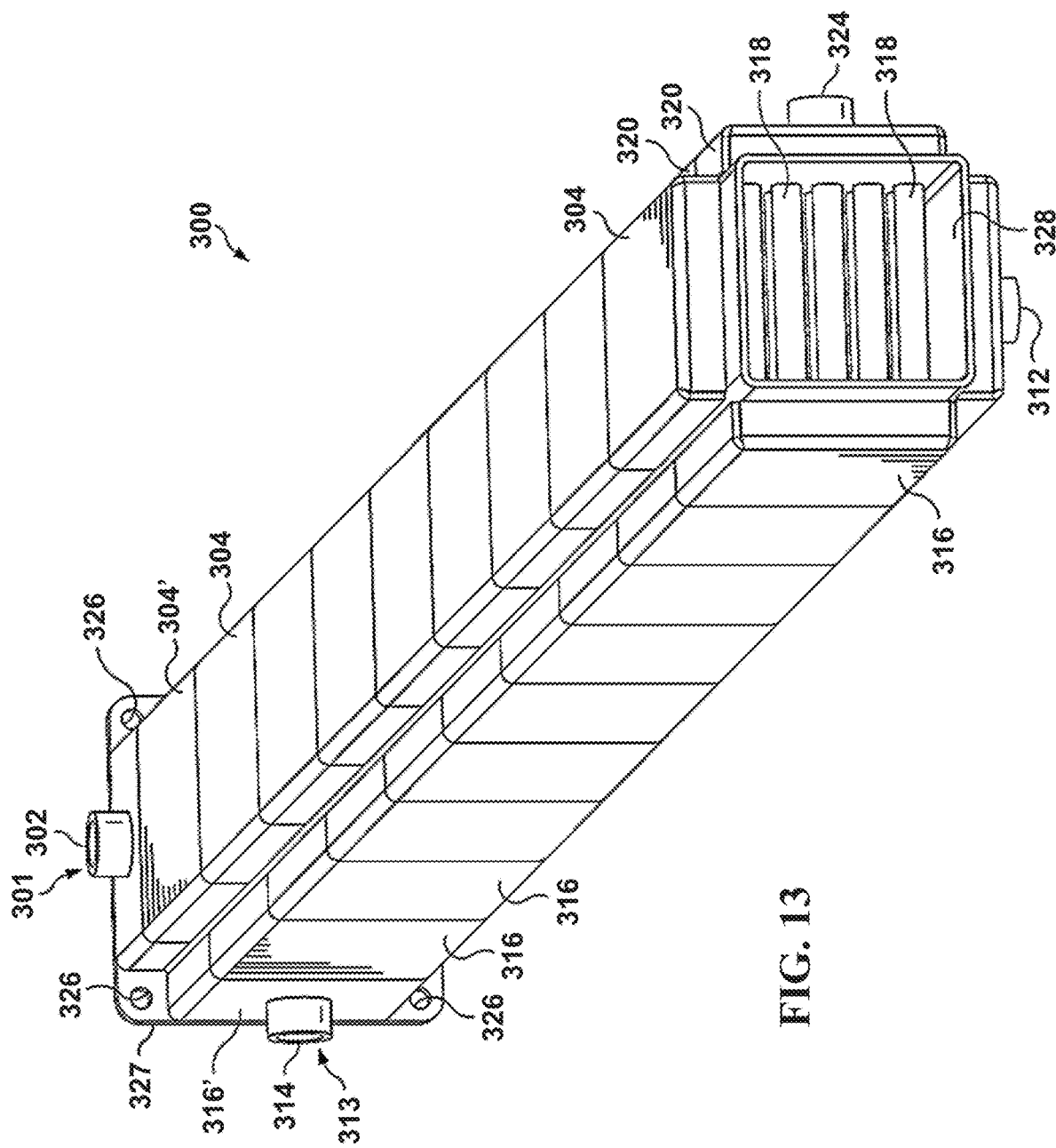
FIG. 13 is an oblique cross-sectional end view of the heat exchanger of FIGS. 11-13 according to an embodiment of the disclosure.

Referring now to FIGS. 11-13, an oblique side view, an oblique cross-sectional side view, and an oblique end view of a heat exchanger 300 are shown, respectively, according to an embodiment of the disclosure. The heat exchanger 300 comprises a first fluid circuit 301 having a first inlet 302, a plurality of top headers 304, a plurality of downward tubes 306, a plurality of bottom headers 308, a plurality of upward tubes 310, and a first outlet 212. The first inlet 302 is connected in fluid communication with a first top header 304' and is configured to receive a fluid there through and allow the fluid to enter the first top header 304'. The first top header 304' is connected in fluid communication with a first set of downward tubes 306, which is connected in fluid communication with a bottom header 308. Fluid from the first top header 304' may flow through the first set of downward tubes 306 into a bottom header 308. The bottom header 308 may also be connected in fluid communication with a set of upward tubes 310 that may carry fluid from the bottom header 308 through the upward tubes 310 and into another top header 304. Accordingly, this pattern may continue along the length of the heat exchanger 300, such that each top header 304 transfers fluid through a set of downward tubes 306 into a bottom header 308 and subsequently from the bottom header 308 through a set of upward tubes 310 into an adjacently downstream located top header 304.

Furthermore, it will be appreciated that downward tubes 306 may be associated with carrying a fluid from a top header 304 in a downward direction towards and into a bottom header 308, and upward tubes 310 may be associated with carrying a fluid from a bottom header 308 in an upward direction towards and into a top header 304. This pattern may continue along the length of the heat exchanger 300 until a last set of downward tubes 306 carries fluid through into a final bottom header 308' and out of the first outlet 312. Accordingly, the first fluid circuit 301 comprises passing fluid from the first inlet 302 into the first top header 304' through a repetitive serpentine series of downward tubes 306, a bottom header 308, a set of upward tubes 310, and a top header 304 until passing through a final set of downward tubes 306 into the final bottom header 308' and exiting the heat exchanger 300 through the first outlet 312. Furthermore, in other embodiments, it will be appreciated that the first inlet 302 and/or the first outlet 312 may alternatively be disposed both in a top header 304, both in a bottom header 308, or in opposing top and bottom headers 304, 308.

The heat exchanger 300 also comprises a second fluid circuit 313 having a second inlet 314, a plurality of left headers 316, a plurality of rightward tubes 318, a plurality of right headers 320, a plurality of leftward tubes 322, and a second outlet 324. The rightward tubes 318 and the leftward tubes 322 may be oriented substantially perpendicular to the downward tubes 306 and the upward tubes 310 of the first fluid circuit 301. The second inlet 314 is connected in fluid communication with a first left header 316' and is configured to receive a fluid there through and allow the fluid to enter the first left header 316'. The first left header 316' is connected in fluid communication with a first set of rightward tubes 318, which is connected in fluid communication with a right header 320. Fluid from the first left header 316' may flow through the first set of rightward tubes 318 into a right header 320. The right header 320 may also be connected in fluid communication with a set of leftward tubes 322 that may carry fluid from the right header 320 through the leftward tubes 322 and into another left header 316. Accordingly, this pattern may continue along the length of the heat exchanger 300, such that each left header 316 transfers fluid through a set of rightward tubes 318 into a right header 320 and subsequently from the right header 320 through a set of leftward tubes 322 into an adjacently downstream located left header 316.

Furthermore, it will be appreciated that rightward tubes 318 may be associated with carrying a fluid from a left header 316 in a rightward direction towards and into a right header 320, and leftward tubes 322 may be associated with carrying a fluid from a right header 320 in a leftward direction towards and into a left header 316. This pattern may continue along the length of the heat exchanger 300 until a last set of rightward tubes 318 carries fluid through into a final right header 320' and out of the second outlet 324. Accordingly, the second fluid circuit 313 comprises passing fluid from the second inlet 314 into the first left header 316' through a repetitive serpentine series of a set of rightward tubes 318, a right header 320, a set of leftward tubes 322, and a left header 316 until passing through a final set of rightward tubes 318 into the final right header 320' and exiting the heat exchanger 300 through the second outlet 324. Furthermore, in other embodiments, it will be appreciated that the second inlet 314 and/or the second outlet 324 may alternatively be disposed both in a left header 316, both in a right header 320, or in opposing left and right headers 316, 320. Additionally, it will be appreciated that in some embodiments, the heat exchanger 300 may comprise only one of the first fluid circuit 301 and the second fluid circuit 313.

First Fluid circuit 301 and the second fluid circuit 313 may comprise different lengths. Accordingly, the first inlet 302 and/or the first outlet 312 may be disposed in any of the top headers 304 or bottom headers 308, and the second inlet 314 and/or the second outlet 324 may be disposed in any of the left headers 316 and the right headers 320 to vary the length of the fluid circuits 301, 313, respectively. By altering the length of the fluid circuits 301, 313, the heat exchanger 300 may be configured to maintain a temperature gradient, reduce a pressure drop, and/or otherwise control the temperature and/or pressure of the fluid though each of the fluid circuits 301, 313.

The tubes 306, 310, 318, 322 of the heat exchanger 300 may generally be arranged to provide a compact, highly resistive flowpath through the fluid duct 328. In order to effectively and/or evenly distribute the heat produced by a coupled burner assembly (which may comprise burner assembly 100 or burner assembly 200, each previously described above) through the tubes 306, 310, 318, 322, sets and/or rows of tubes 306, 310 may be interstitially and/or alternatively spaced with sets and/or rows of tubes 318, 322. In the shown embodiment, two rows of downward tubes 306, two rows of rightward tubes 318, two rows of upward tubes 310, and two rows of leftward tubes 322 are interstitially and/or alternatively spaced, respectively, along the length of the heat exchanger 300. However, in alternative embodiments, a single row of tubes 306, 310, 318, 322 may be interstitially and/or alternatively spaced, respectively, along the length of the heat exchanger 300. In other embodiments, however, heat exchanger 300 may comprise any number of rows of tubes 306, 310, 318, 322 interstitially and/or alternatively spaced along the length of the heat exchanger 300. For example, heat exchanger 300 may comprise three rows of downward tubes 306, two rows of rightward tubes 318, three rows of upward tubes 310, and two rows of leftward tubes 322 may be interstitially and/or alternatively spaced. Accordingly, it will be appreciated that the number of rows of tubes 306, 310, 318, 322 interstitially and/or alternatively spaced may vary, so long as at least one row of vertically-oriented tubes 306, 310 is disposed adjacently with at least one row of horizontally-oriented tubes 318, 322 along the length of the heat exchanger 300.

Heat exchanger 300 also comprises a plurality of mounting holes 326 disposed through a mounting flange 327 that is disposed at the distal end of the heat exchanger 300 located closest to the first inlet 302 and the second inlet 314. The mounting holes 326 may generally be configured to mount the heat exchanger 300 to a burner assembly (e.g., either the burner assembly 100 of FIGS. 1-5 or the burner assembly 200 of FIGS. 6-10). In some embodiments, the heat exchanger 300 may be secured to a burner assembly via fasteners such as bolts, rivets, etc. (e.g., fasteners 124). However, in other embodiments, the heat exchanger 300 may be secured to a burner assembly through an alternative mechanical interface (e.g., plate, adapter, etc.). While mounting flange 327 is shown as having a rectangular (or square) shape, it should be appreciated that flange 327 may be differently shaped or formed (e.g., flange 327 may be circular or curved in shape) to accommodate the connection between the chosen burner assembly (e.g., burner assembly 100, 200) and heat exchanger 300. The heat exchanger 300 is secured to the chosen burner assembly so that combusted fuel and/or combusted air/fuel mixture is forced through a plurality of inner walls of the heat exchanger 300 that form a fluid duct 328 through the heat exchanger 300. Accordingly, heat from the combusted fuel and/or the combusted air/fuel mixture may be absorbed by a fluid flowing through the tubes 306, 310, 318, 322 of the heat exchanger 300. The heated fluid may exit the heat exchanger 300 through the first outlet 312 and the second outlet 324 of the first fluid circuit 301 and the second fluid circuit 313, respectively, and therefore be used to heat and/or cook consumable products (i.e., chips, crackers, frozen foods).

In operation, the configuration of tubes 306, 310, 318, 322 provides a compact, highly resistive flow path through the fluid duct 328. Accordingly, to force combusted fuel and/or combusted air/fuel mixture through the fluid duct 328 requires high velocity. Accordingly, the velocity of the combusted fuel and/or the combusted air/fuel mixture through the high velocity burners (or sub-burners) of the chosen burner assembly (e.g., first burners 126 of the burner assembly 100; first sub-burners 240 of burner assembly 200, etc.) is high enough to provide the requisite velocity needed to overcome the resistance to flow through the heat exchanger 300. Furthermore, the lower velocity of the combusted fuel and/or the combusted air/fuel mixture through the low velocity burners of the chosen burner assembly (e.g., second sub-burners 127 or second burners 138 of the burner assembly 100; second sub-burners 241 of burner assembly 200, etc.) prevents "lift off" so that the combustion process remains constant through the burner assembly (i.e., burner assembly 100 or 200).

Figure 14:
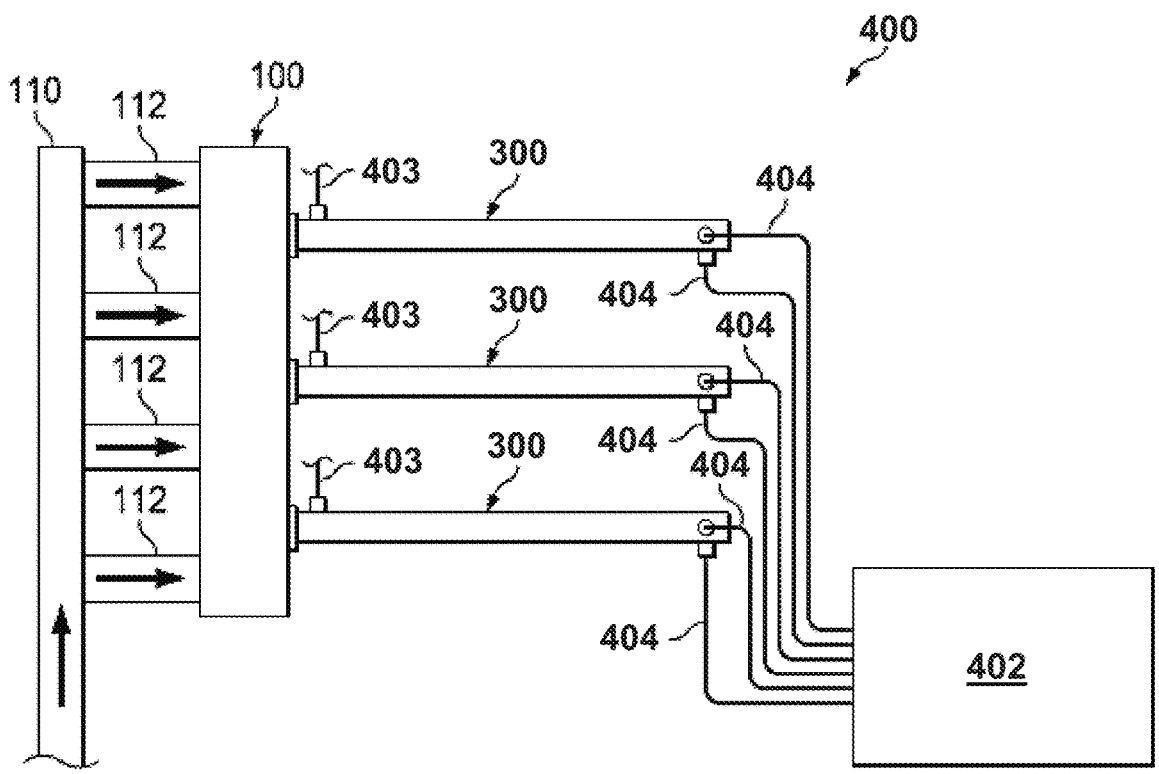
FIG. 14 is a schematic of a cooking system according to an embodiment of the disclosure.

Referring now to FIG. 14, a schematic of a cooking system 400 is shown according to an embodiment of the disclosure. Cooking system 400 generally comprises at least one burner assembly 100, at least one heat exchanger 300, at least one cooking vessel 402 (e.g., a fryer), at least one oil input line 403, and at least one oil output line 404. In this embodiment, cooking system 400 utilizes burner assembly 100; however, it should be appreciated that cooking system 400 may alternatively or additionally include burner assembly 200 as described in more detail below. As previously disclosed, the burner assembly 100 may be mounted to at least one heat exchanger 300. However, in this embodiment, the burner assembly 100 may be mounted to a plurality of heat exchangers 300. Furthermore, while not shown, in some embodiments, multiple burner assemblies 100 may be mounted to multiple heat exchangers 300 in the cooking system 400. The burner assembly 100 is configured to provide a high velocity flow of combusted fuel and/or combusted air/fuel mixture through the fluid duct 328 of the heat exchangers 300.

Fluid, such as a cooking fluid (e.g., oil, water, etc.) may be pumped into the first inlet 302 and/or the second inlet 314 of the heat exchangers 300 (see FIGS. 11-13) through a plurality of oil input lines 303, each oil input line 303 being associated with a respective inlet 302, 314. Fluid may enter the oil input lines 403 from a reservoir and/or may be circulated through the heat exchangers 300 from the cooking vessel 402. The fluid may be pumped and/or passed through the tubes 306, 310, 318, 322 of the heat exchangers 300 (see FIGS. 11-13). Heat produced from the combustion of fuel and/or an air/fuel mixture in the burner assembly 100 may be transferred to the fluid flowing through the tubes 306, 310, 318, 322 of the heat exchangers 300 (see FIGS. 11-13). The heated fluid may exit the heat exchanger 300 through the first outlet 312 and the second outlet 324 and be carried into the cooking vessel 402 through a plurality of oil output lines 404, each oil output line 404 being associated with a respective outlet 312, 324. In some embodiments, the heated fluid may be carried into the cooking vessel 402 at different locations to maintain a proper temperature, temperature gradient, and/or temperature profile within the cooking vessel 402. As stated, in some embodiments, fluid from the cooking vessel 402 may be recirculated through the oil input lines 403 and reheated within the heat exchangers 300. Furthermore, it will be appreciated while burner assembly 100 is disclosed in the context of food service equipment (e.g., fryer, boiler), the burner assembly 100 may be used for any application or industry that requires a fluid to be heated rapidly, consistently, and efficiently.

Additionally, as previously mentioned above, in some embodiments burner assembly 200 may be used in place of burner assembly 100 within cooking system 400. In these embodiments, fuel and/or air/fuel mixture is forced through burner assembly 200 from upstream end 200a to downstream end 200b (i.e., through cavity 202 and burners 220) so that the fuel (or mixture) combusts within combustion chambers 226 and is emitted through fluid duct 328 of heat exchangers 300 in the same manner as described above for burner assembly 100 (see FIGS. 6, 7, 10, and 11-14).

Figure 15:
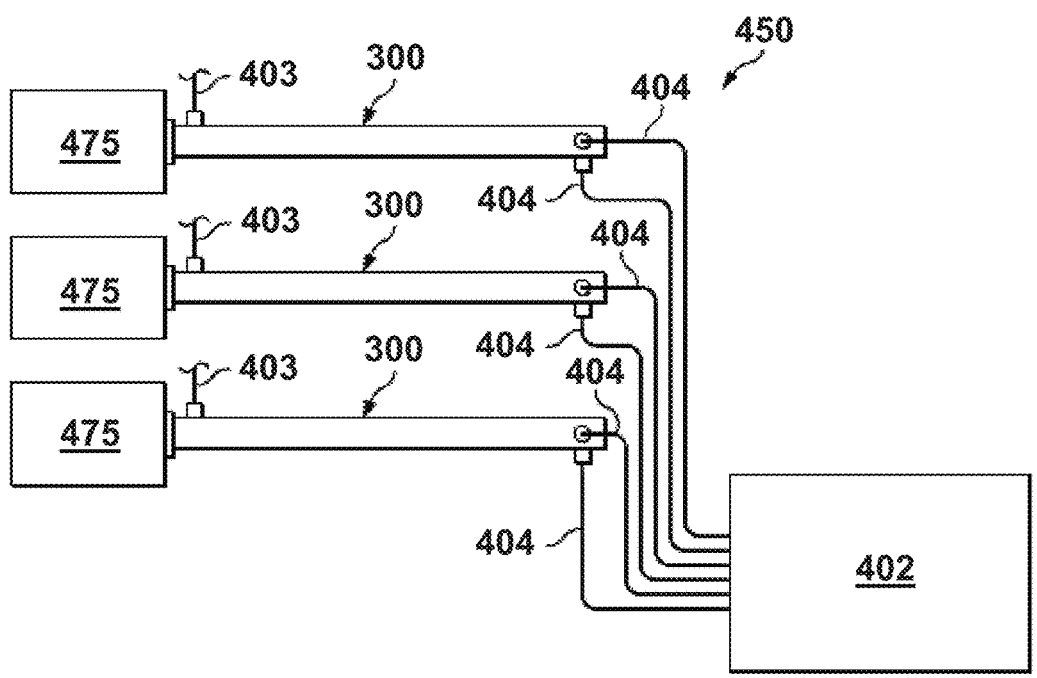
FIG. 15 is a schematic of a cooking system according to another embodiment of the disclosure.

Referring now to FIG. 15, a schematic of a cooking system 450 is shown according to another embodiment of the disclosure. Cooking system 450 may be substantially similar to cooking system 400 of FIG. 14. However, cooking system 450 comprises a plurality of burner assemblies 475 (which may each comprise burner assembly 100, burner assembly 200, or a combination of burner assembles 100, 200), a plurality of heat exchangers 300, at least one cooking vessel 402 (i.e., a fryer), at least one oil input line 403 per heat exchanger 300, and at least one oil output line 404 per heat exchanger 300. As previously disclosed, each burner assembly 475 may be associated with at least one heat exchanger 300. However, in this embodiment, each burner assembly 475 may be mounted to a single heat exchanger 300. Each burner assembly 475 is configured to provide a high velocity flow of combusted fuel and/or combusted air/fuel mixture through the fluid duct 328 of the associated heat exchanger 300 (see FIGS. 11-13).

Fluid, such as a cooking fluid (e.g., oil) may be pumped into the first inlet 302 and/or the second inlet 314 of the heat exchanger 300 through a plurality of oil input lines 403, each oil input line 403 being associated with a respective inlet 302, 314 (see FIGS. 11-13). Fluid may enter the oil input lines 403 from a reservoir and/or may be circulated through the heat exchangers 300 from the cooking vessel 402. The fluid may be pumped and/or passed through the tubes 306, 310, 318, 322 of the heat exchanger 300 (see FIGS. 11-13). Heat produced from the combustion of fuel and/or an air/fuel mixture in the burner assemblies 475 may be transferred to the fluid flowing through the tubes 306, 310, 318, 322 of each respective heat exchanger 300 (see FIGS. 11-13). The heated fluid may exit the heat exchangers 300 through the first outlet 312 and the second outlet 324 of each heat exchanger 300 and be carried into the cooking vessel 402 through a plurality of oil output lines 404, each oil output line 404 being associated with a respective outlet 312, 324.

In some embodiments, the heated fluid may be carried into the cooking vessel 402 at different locations to maintain a proper temperature, temperature gradient, and/or temperature profile within the cooking vessel 402. Furthermore, it will be appreciated that each burner assembly 475 may be individually controlled by a burner controller (not pictured). As such, in some embodiments, each burner assembly 475 may be operated at substantially similar temperatures. However, in other embodiments, each burner assembly 475 may be operated at different temperatures to maintain a temperature gradient across the cooking vessel 402 and/or to control a cooking process requiring different temperatures. Still further, while multiple burner assemblies 475 and multiple heat exchangers 300 are pictured, in some embodiments, a single burner assembly 475 may be associated with a single heat exchanger 300 to provide heated fluid to the cooking vessel 402. As stated, in some embodiments, fluid from the cooking vessel 402 may be recirculated through the oil input lines 403 and reheated within the heat exchangers 300. Furthermore, it will be appreciated while burner assembly 475 is disclosed in the context of food service equipment (e.g., fryer, boiler), the burner assembly 475 may be used for any application or industry that requires a fluid to be heated rapidly, consistently, and efficiently.

Referring now to FIGS. 16 and 17, an oblique side view and an oblique cross-sectional side view of a heat exchanger 500 are shown, respectively, according to an embodiment of the disclosure. The heat exchanger 500 generally comprises a top wall 504, a bottom wall 506, a left side wall 508, and a right side wall 510 that define a fluid duct 522 having an inlet 502 and an outlet 512 through the heat exchanger 500. Heat exchanger 500 also comprises a plurality of vertical tubes 514 that extend between the top wall 504 and the bottom wall 506. The plurality of vertical tubes 514 may extend through the top wall 504 and the bottom wall 506 to allow ingress and egress of fluid into the vertical tubes 514 through each of the top wall 504 and bottom wall 506. Additionally, heat exchanger 500 also comprises a plurality of horizontal tubes 516 that extend between the left side wall 508 and the right side wall 510. The plurality of horizontal tubes 516 may extend through the left side wall 508 and the right side wall 510 to allow ingress and egress of fluid into the horizontal tubes 516 through each of the left side wall 508 and the right side wall 510.

The vertical tubes 514 and the horizontal tubes 516 of the heat exchanger 500 may generally be arranged to provide a compact, highly resistive flow path through the fluid duct 522. In order to effectively and/or evenly distribute the heat produced by a burner assembly (e.g., burner assembly 100 or 200) through the vertical tubes 514 and the horizontal tubes 516, sets and/or rows of vertical tubes 514 may be interstitially and/or alternatively spaced with sets and/or rows of horizontal tubes 516. In the shown embodiment, two rows of vertical tubes 514 are interstitially and/or alternatively spaced with two rows of horizontal tubes 516 along the length of the heat exchanger 500. However, in alternative embodiments, a single row of vertical tubes 514 may be interstitially and/or alternatively spaced with a single row of horizontal tubes 516 along the length of the heat exchanger 500. In other embodiments, however, heat exchanger 500 may comprise any number of rows of vertical tubes 514 interstitially and/or alternatively spaced with any number of rows of horizontal tubes 516 along the length of the heat exchanger 500. For example, heat exchanger 500 may comprise three rows of vertical tubes 514 interstitially and/or alternatively spaced with two rows of horizontal tubes 516. Accordingly, it will be appreciated that the number of rows or vertical tubes 514 interstitially and/or alternatively spaced with rows of horizontal tubes 516 may vary, so long as at least one row of vertical tubes 514 is interstitially and/or alternatively spaced with at least one row of horizontal tubes 516 along the length of the heat exchanger 500.

The heat exchanger 500 also comprises a plurality of mounting holes 518 disposed through a mounting flange 520 that is disposed at the distal end of the heat exchanger 500 located closest to the inlet 502. The mounting holes 518 may generally be configured to mount the heat exchanger 500 to a burner assembly (e.g., either the burner assembly 100 of FIGS. 1-5 or the burner assembly 200 of FIGS. 6-10). In some embodiments, the heat exchanger 500 may be secured to a burner assembly via fasteners such as bolts, rivets, etc. (e.g., fasteners 124). However, in other embodiments, the heat exchanger 500 may be secured to a burner assembly through an alternative mechanical interface (e.g., plate, adapter, etc.). While mounting flange 520 is shown as having a rectangular (or square) shape, it should be appreciated that flange 520 may be differently shaped or formed (e.g., flange 520 may be circular or curved in shape) to accommodate the connection between the chosen burner assembly (e.g., burner assembly 100, 200) and heat exchanger 500. The heat exchanger 500 is secured to the chosen burner assembly so that combusted fuel and/or combusted air/fuel mixture is forced through the fluid duct 522 of the heat exchanger 500. Accordingly, heat from the combusted fuel and/or combusted air/fuel mixture may be absorbed by a fluid flowing through the tubes 514, 516 of the heat exchanger 500. The heated fluid may exit heat exchanger 500 through the tubes 514, 516 and therefore be used to heat and/or cook consumable products (i.e., chips, crackers, frozen foods).

In operation, the configuration of tubes 514, 516 provides a compact, highly resistive flow path through the fluid duct 522. Accordingly, to force combusted fuel and/or combusted air/fuel mixture through the fluid duct 522 requires high velocity. Accordingly, the velocity of the combusted fuel and/or the combusted air/fuel mixture through the high velocity burners of the burner assembly (e.g., first burners 126 of the burner assembly 100; first sub-burners 240 of burner assembly 200, etc.) is high enough to provide the requisite velocity needed to overcome the resistance to flow through the heat exchanger 500. Furthermore, the lower velocity of the combusted fuel and/or the combusted air/fuel mixture through the low velocity burners of the burner assembly (e.g., second sub-burners 127 or second burners 138 of the burner assembly 100; the second sub-burners 241 of burner assembly 200, etc.) prevents "lift off" so that the combustion process remains constant through the burner assembly (i.e., burner assembly 100 or 200).

Figure 18:
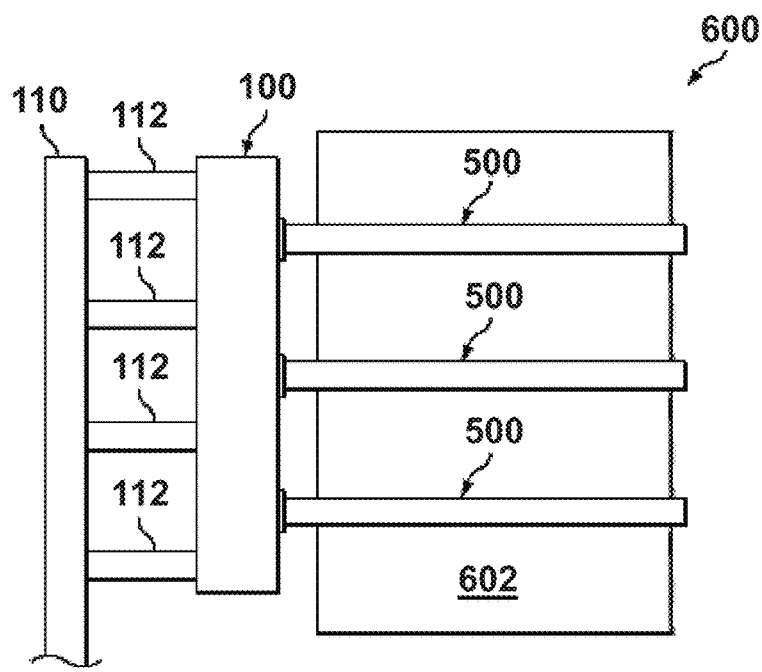
FIG. 18 is a schematic top view of a cooking system according to an embodiment of the disclosure.
Figure 19:
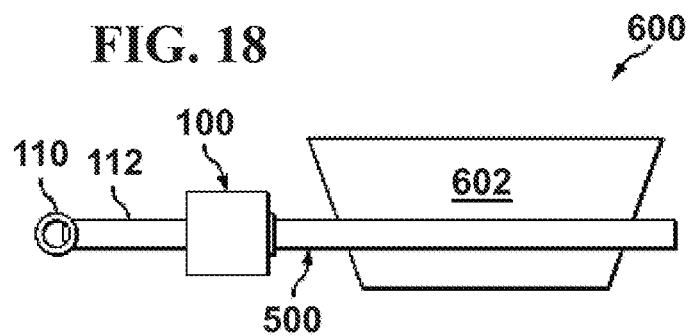
FIG. 19 is a schematic side view of the cooking system of FIG. 18 according to an embodiment of the disclosure.

Referring now to FIGS. 18 and 19, a schematic top view and a schematic side view of a cooking system 600 are shown, respectively, according to an embodiment of the disclosure. Cooking system 600 generally comprises at least one burner assembly 100, at least one heat exchanger 500, and at least one cooking vessel 602 (e.g., a fryer). In this embodiment, cooking system 600 utilizes burner assembly 100; however, it should be appreciated that cooking system 600 may alternatively or additionally include burner assembly 200 as described in more detail below. As previously disclosed, the burner assembly 100 may be mounted to at least one heat exchanger 500. However, in this embodiment, the burner assembly 100 may be mounted to a plurality of heat exchangers 500. Furthermore, while not shown, in some embodiments, multiple burner assemblies 100 may be mounted to multiple heat exchangers 500 in the cooking system 600. The burner assembly 100 is configured to provide a high velocity flow of combusted fuel and/or combusted air/fuel mixture through the fluid duct 522 of the heat exchanger 500 (see FIGS. 16 and 17). The heat exchangers 500 may generally be submerged in the cooking vessel 602.

Fluid, such as a cooking fluid (e.g., oil) contained within the cooking vessel 602, may be free to flow through the vertical tubes 514 and horizontal tubes 516 of the heat exchanger 500 (see FIGS. 16 and 17). Heat produced from the combustion of fuel and/or an air/fuel mixture in the burner assembly 100 may enter the inlet 502 of the heat exchanger 500 from the burner assembly 100 and be transferred to the fluid flowing through and/or contained within the tubes 514, 516 of the heat exchanger 500. Accordingly, in embodiments comprising multiple heat exchangers 500, the heat exchangers 500 may be disposed throughout the cooking vessel 602 at substantially similar intervals and/or uniformly spaced to maintain a substantially uniform temperature within the cooking vessel 602. However, in other embodiments comprising multiple heat exchangers 500, the heat exchangers 500 may be disposed to maintain a temperature gradient and/or temperature profile within the cooking vessel 602. The heated fluid may flow through and exit the tubes 514, 516 of heat exchanger 500 back into cooking vessel 602. In some embodiments, the outlet 512 of duct 522 (which carries combusted fluids from burner assembly 100) may extend through the cooking vessel 602 and be discharged to an outside environment through a collective exhaust header (not shown) and/or any other ductwork to expel the combusted gases. In some embodiments, fluid from the cooking vessel 602 may be circulated within the cooking vessel 602 by a pump (not shown) to increase and/or promote fluid flow through the tubes 514, 516 of the heat exchanger 500. Furthermore, it will be appreciated while burner assembly 100 is disclosed in the context of food service equipment (e.g., cooking vessel, fryer, boiler), the burner assembly 100 may be used for any application or industry that requires a fluid to be heated rapidly, consistently, and efficiently.

Additionally, as previously mentioned above, in some embodiments burner assembly 200 may be used in place of burner assembly 100 within cooking system 600. In these embodiments, fuel and/or air/fuel mixture is forced through burner assembly 200 from upstream end 200*a* to downstream end 200*b* (i.e., through cavity 202 and burners 220) so that the fuel (or mixture) combusts within combustion chambers 226 and is emitted through fluid duct 522 of heat exchangers 500 in the same manner as described above for burner assembly 100 (see FIGS. 6, 7, 10, and 11-14).

Figure 20:
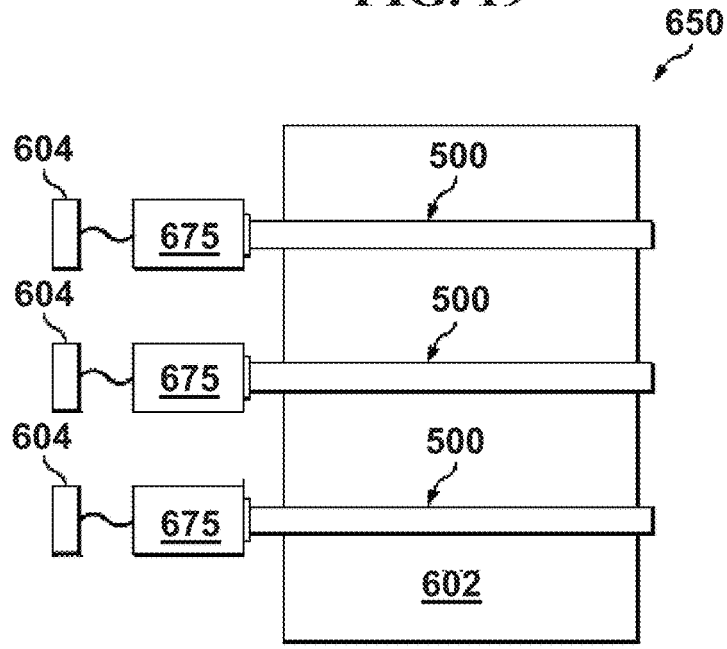
FIG. 20 is a schematic top view of a cooking system according to another embodiment of the disclosure.

Referring now to FIG. 20, a schematic top view of a cooking system 650 is shown according to another embodiment of the disclosure. Cooking system 650 may be substantially similar to cooking system 600 of FIGS. 18 and 19. However, in this embodiment, cooking system 650 comprises a plurality of burner assemblies 675, wherein each burner assembly 675 may be mounted to a single heat exchanger 500. As is similarly described above for burner assemblies 475 in FIG. 15, burner assemblies 675 may each comprise burner assembly 100, burner assembly 200, or a combination of burner assemblies 100, 200. The burner assembly 675 is configured to provide a high velocity flow of combusted fuel and/or combusted air/fuel mixture through the fluid duct 522 of the heat exchanger 500 (see FIGS. 16 and 17). The heat exchangers 500 may generally be submerged in the cooking vessel 602. Fluid, such as a cooking fluid (e.g., oil) contained within the cooking vessel 602, may be free to flow through the vertical tubes 514 and horizontal tubes 516 of the heat exchanger 500 (see FIGS. 16 and 17). Heat produced from the combustion of fuel and/or an air/fuel mixture in the burner assembly 675 may enter the inlet 502 of each heat exchanger 500 from the burner assembly 675 and be transferred to the fluid flowing through and/or contained within the tubes 514, 516 of the heat exchanger 500. Additionally, heat may be transferred to the fluid within the cooking vessel 602 that contacts any outer surface of the heat exchangers 500.

In this embodiment, the heat exchangers 500 may generally be disposed throughout the cooking vessel 602 at substantially similar intervals and/or uniformly spaced to maintain a substantially uniform temperature within the cooking vessel 602. However, in other embodiments, the heat exchangers 500 may be disposed at any other interval and/or spacing based on a desired temperature profile across the cooking vessel 602 and/or the configuration of the cooking vessel 602. Thus, in some embodiments, the burner assemblies 675 and heat exchangers 500 are disposed to maintain a temperature gradient and/or temperature profile within the cooking vessel 602. In addition, to accomplish control of the burner assemblies 675, each burner assembly 675 may be controlled by a burner assembly controller 604. As such, the burner assembly controller 604 may control each burner assembly 675 to a specified amount of heat in order to maintain a temperature gradient and/or temperature profile of the fluid within the cooking vessel 602. However, in other embodiments, the burner assemblies 675 may be controlled to provide a substantially similar amount of heat to maintain a substantially similar temperature of the fluid throughout the cooking vessel 602. In such embodiments, multiple burner assemblies 675 may, at least in some instances, be controlled by a single burner assembly controller 604. The heated fluid may flow through and exit the tubes 514, 516 of heat exchanger 500 back into cooking vessel 602. In some embodiments, the outlet 512 of duct 522 (which carries combusted fluids from burner assembly 100) may extend through the cooking vessel 602 and be discharged to an outside environment through a collective exhaust header (not shown) and/or any other ductwork to expel the combusted gases. In some embodiments, fluid may be circulated within the cooking vessel 602 by a pump (not shown) to increase and/or promote fluid flow through the tubes 514, 516 of the heat exchanger 500. Furthermore, it will be appreciated while burner assembly 675 is disclosed in the context of food service equipment (i.e., cooking vessel, fryer, boiler), the burner assembly 675 may be used for any application or industry that requires a fluid to be heated rapidly, consistently, and efficiently.

Figure 21:
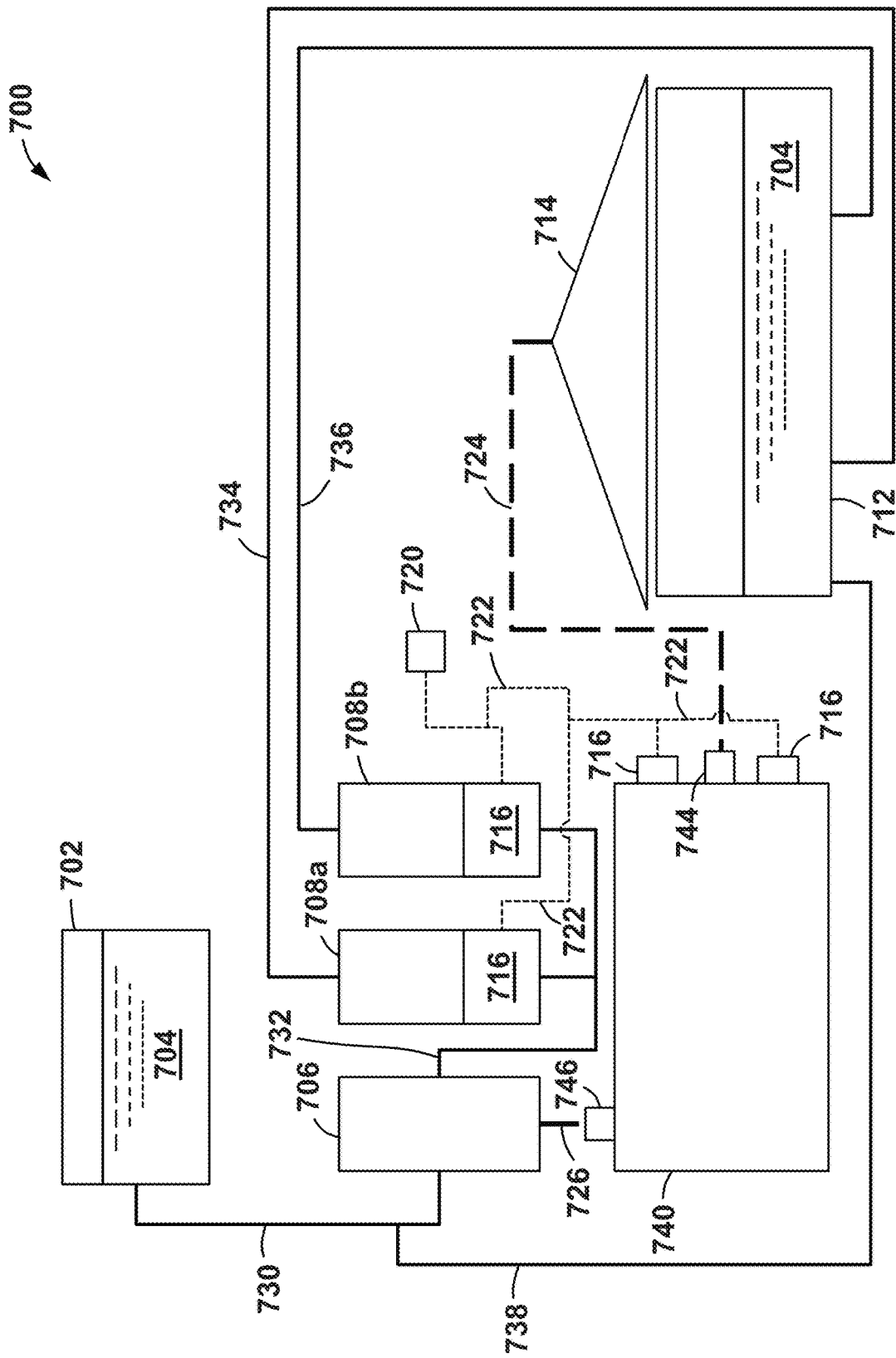
FIG. 21 is a schematic view of a cooking system according to another embodiment of the disclosure.

Referring now to FIG. 21, a schematic view of a cooking system 700 is shown according to another embodiment of the disclosure. Cooking system 700 generally includes a reservoir 702, a first heat exchanger 706, a plurality of second heat exchangers 708a, 708b, a cooking vessel 712, and a thermal oxidizer 740. In addition, cooking system 700 includes a cooking fluid circuit comprising conduits 730, 732, 734, 736, 738, an exhaust system comprising conduits 724, 726, and a fuel system comprising conduits 722 and header 720. Each of the conduits 730, 732, 734, 736, 738, 724, 726, 722 may comprise any suitable fluid conveyance member capable of channeling fluids there through. For example, conduits 730, 732, 734, 736, 738, 724, 726, 722 may comprise pipes, hoses, open channels, or other fluid conveyances.

Cooking vessel 712 may comprise any suitable vessel or tub for containing a cooking fluid 704 (e.g., oil, water, etc.) at a high temperature. For example, cooking vessel 712 may be similar to cooking vessels 402, 602 previously described above (see FIGS. 14, 15, and 18-20). Reservoir 702 may comprise a tank or vessel (or collection of vessels) that is configured to hold or store the cooking fluid 704 for use within cooking system 700.

Heat exchangers 706, 708a, 708b may comprise any suitable device for transferring heat between two fluids (e.g., such as heat exchangers 300, 500, previously described). In this embodiment, each of the heat exchangers 706, 708a, 708b is the same (or similar to) heat exchanger 300 of FIGS. 11-13. As will be described in more detail below, heat exchangers 706, 708a, 708b are utilized within cooking system 700 to transfer heat to cooking fluid 704 so that cooking fluid 704 is at a sufficient temperature to carry out the desired cooking reaction (e.g., frying) within cooking vessel 712. Each of the heat exchangers 708a, 708b include a burner assembly 716 that may comprise burner assembly 100 or burner assembly 200 previously described above (it should be appreciated that heat exchangers 708a, 708b may share a single burner assembly 716 in other embodiments). In this embodiment, burner assemblies 716 each comprise the burner assembly 200 previously described above (see FIGS. 6-10). As with cooking systems 400, 600, burner assemblies 716 are used to combust fuel (e.g., natural gas) to provide heat to the cooking fluid 704 as it flows through heat exchangers 708a, 708b. In addition, as will be described in more detail below, in this embodiment heat exchanger 706 does not include a burner assembly 716 and instead utilizes heat from thermal oxidizer 740 (described below) to increase the temperature of cooking fluid 704 flowing therein.

Figure 22:
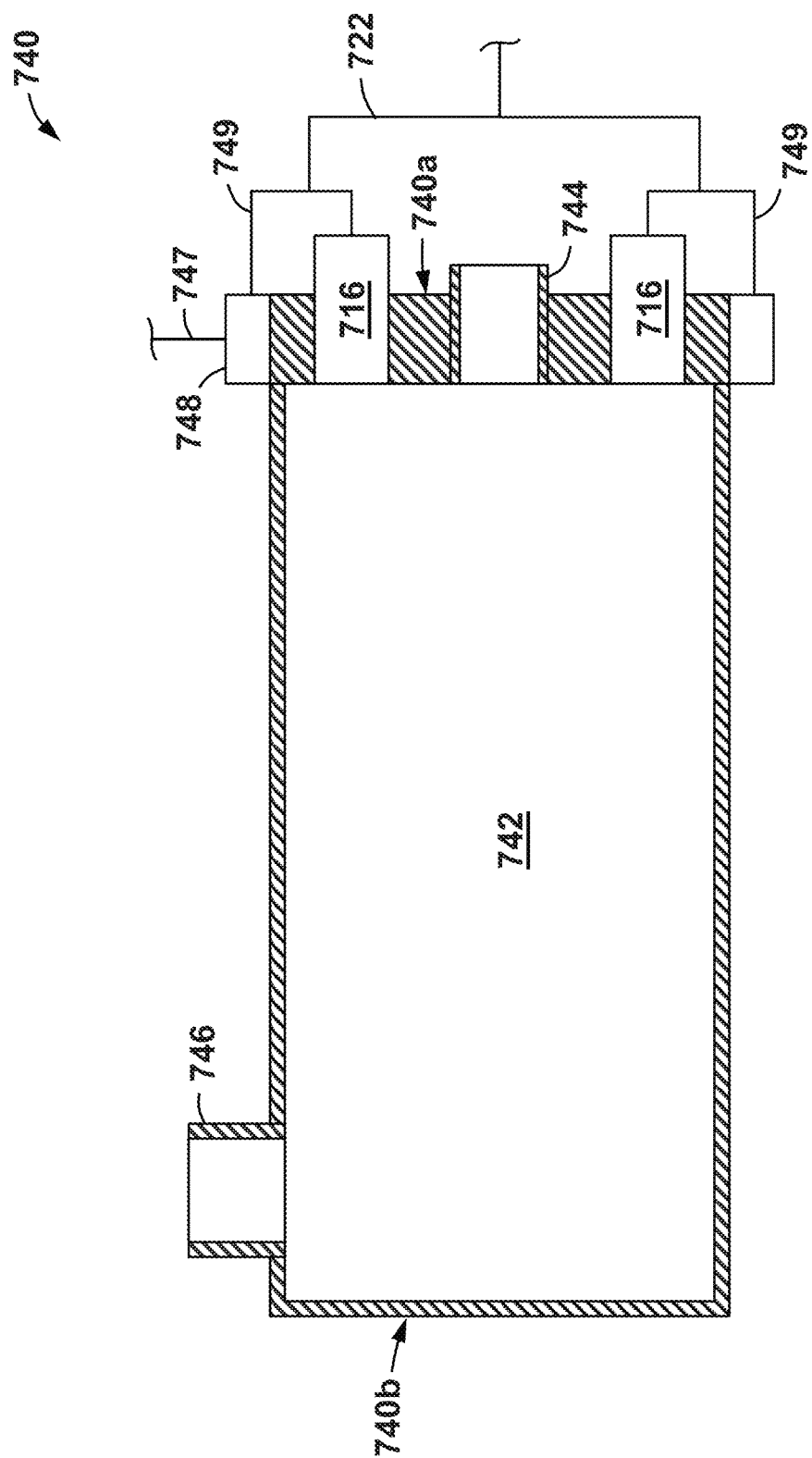
FIG. 22 is a schematic view of a thermal oxidizer for use within the cooking system of FIG. 21 according to an embodiment of the disclosure.

Referring now to FIG. 22, a schematic side cross-sectional view of thermal oxidizer 740 is shown. Thermal oxidizer 740 is a vessel comprising a first or upstream end 740a, a second or downstream end 740b opposite upstream end 740a, and an internal chamber 742. An inlet 744 into internal chamber 742 is disposed at upstream end 740a, and an outlet 746 from internal chamber 742 is disposed proximate downstream end 740b. A plurality of burner assemblies 716 are disposed at upstream end 740a and extend into chamber 742. In this embodiment, the burner assemblies 716 on thermal oxidizer 740 are evenly circumferentially disposed about inlet 744 (or a central axis of inlet 744). The burner assemblies 716 on thermal oxidizer 740 may comprise burner assembly 100 or burner assembly 200 previously described above. In this embodiment, each of the burner assemblies 716 on thermal oxidizer 740 comprise the burner assembly 200 of FIGS. 6-10. Fuel (e.g., natural gas, propane, etc.) is provided to burner assemblies 716 from fuel header 720 (which is shown in FIG. 21) via a plurality of fuel supply conduits 722. Fuel header 720 may comprise a supply pipe (or other conduit) or tank that provides a flow of fuel to conduits 722. In some embodiments, fuel header 720 is a main supply pipe of natural gas provided from a local utility service.

A manifold 748 is coupled to thermal oxidizer 740 at upstream end 740a. In this embodiment, manifold 748 is an annular chamber that surrounds oxidizer 740 at upstream end 740a. A supply line 747 provides air (or oxygen) to manifold 748, which is then supplied to fuel supply conduits 722 upstream of burner assemblies 716. As a result, an air/fuel mixture is supplied to burner assemblies 716 via conduits 722, 749 during operations. Upon entering the burner assemblies 716, the air/fuel mixture is combusted in the manner described above for burner assemblies 100, 200 (depending on whether burner assembly 100 or 200 is used) such that hot combusted fluids are emitted into thermal oxidizer 740 at upstream end 740a.

Referring now to FIGS. 21 and 22, during operations, a food item (e.g., chips, crackers, frozen foods, etc.) may be placed into cooking vessel 712 to perform a cooking operation (e.g., frying, boiling, etc.). To facilitate the cooking operation, hot cooking fluid 704 is flowed into cooking vessel 712 via conduits 734, 736. Subsequently, the cooking fluid 704 exits cooking vessel 712 via conduit 738 and flows to heat exchanger 706. In addition, cooking fluid 704 may be flowed to heat exchanger 706 from reservoir 704 via conduit 730 as shown in FIG. 21. As a result of the interaction between the hot cooking fluid 704 and the food item within vessel 712, hot exhaust gases are emitted from vessel 712 that are captured by vent hood 714 and transferred to inlet 744 of thermal oxidizer 740 via conduit 724 (a blower or other suitable compressing or pumping assembly may be included along conduit 724 to facilitate the flow of fluids from vessel 712 into chamber 742 of thermal oxidizer 740). Upon entering internal chamber 742, the exhaust fluids from cooking vessel 712 are heated by the hot combusted gases also emitted into chamber 742 by burner assemblies 716. In some embodiments, at least some of the exhaust fluids entering chamber 742 at inlet 744 are also ignited by the combustion within burner assemblies 716. The heated gases are flowed through chamber 742 from upstream end 740a to downstream end 740b where they are emitted from chamber 742 at outlet 746 and communicated to heat exchanger 706 via conduit 726.

Within heat exchanger 706, heat is transferred from the exhaust fluids entering exchanger 706 via conduit 726 to the cooking fluid 704 entering heat exchanger 706 via conduits 730, 738. As previously described, in this embodiment, heat exchanger 706 (as well as heat exchangers 708a, 708b) is configured the same as heat exchanger 300 previously described above. Accordingly, in this embodiment, the hot fluids emitted from outlet 746 of thermal oxidizer 740 flow through duct 328 of exchanger 706, while the cooking fluid 704 flows through the tubes 306, 310, 318, 322 (see FIGS. 11-13). As a result, the temperature of cooking fluid 704 is increased as it flows within exchanger 706, and the hot exhaust fluids from thermal oxidizer 740 are eventually emitted from duct 328 either into the atmosphere or to another tank, vessel, or process.

Referring now to FIG. 21, upon exiting exchanger 706, the heated cooking fluid 704 then flows in parallel to each of the heat exchangers 708a, 708b, via conduits 732. Fuel (e.g., natural gas, propane, etc.) is provided to burner assemblies 716 within heat exchangers via conduits 722 and is combusted therein in the same manner described above for burner assemblies 100, 200 (depending on whether burner assembly 100 or 200 is used) to provide hot combusted fluids (e.g., gases) that are flowed through heat exchangers 708a, 708b to further increase the temperature of cooking fluid 704 also flowing there through. In particular, the hot combusted fluids from burner assemblies 716 are flowed through ducts 328 of heat exchanger 708a, 708b, while the heated cooking fluid 704 is flowed through tubes 306, 310, 318, 322 of heat exchangers 708a, 708b (see FIGS. 11-13). As a result, additional heat is transferred to the cooking fluid 704 from the combusted fluids emitted from burner assemblies 716 within heat exchangers 708a, 708b such that the cooking fluid 704 is eventually emitted from heat exchangers via conduits 734, 736 at a final cooking temperature. Conduits 734, 736 thereafter provide this heated cooking fluid 704 to vessel 712 to perform the cooking operation as previously described. In some embodiments, air or oxygen may be mixed with the fuel flowing to burner assemblies 716 within exchangers 708a, 708b to facilitate the combustion of the fuel therein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A cooking system including a burner assembly, the burner assembly comprising:
   a plurality of first burners, each including a first bore, a second bore, and a third bore that are concentrically aligned,
   wherein for each first burner:
      the first bore includes a plurality of holes disposed along a circumference of the first bore,
      each hole extends directly into the third bore, and
      the third bore includes a combustion chamber,
      wherein each first burner comprises a first flow path configured to emit fuel or an air/fuel mixture into the combustion chamber at a first flow rate, the first flow path extends from the first bore, through the second bore, and into the third bore, and a plurality of second flow paths configured to emit fuel or an air/fuel mixture into the combustion chamber at a second flow rate that is less than the first flow rate, the plurality of second flow paths extend from the first bore, through the plurality of holes, and into the third bore, and
      wherein a lower end of the third bore extends below a lower end of the second bore.

2. The cooking system of claim 1, further comprising:
   a heat exchanger configured to receive a combusted fuel and/or a combusted air/fuel mixture from the burner assembly, the heat exchanger including a duct that is configured to receive the combusted fuel and/or the combusted air/fuel mixture from the burner assembly; and
   a cooking vessel fluidly coupled to the heat exchanger.

3. The cooking system of claim 2, wherein the heat exchanger further includes:
   a first fluid circuit fluidly coupled to the cooking vessel, the first fluid circuit including:
      top headers positioned on a top side of the duct;
      bottom headers positioned on a bottom side of the duct;
      upward tubes fluidly coupled to the bottom headers and the top headers, wherein the upward tubes are downstream from the bottom headers, wherein the upward tubes are positioned within the duct; and
      downward tubes fluidly coupled to the top headers and the bottom headers, wherein the downward tubes are downstream from the top headers, wherein the downward tubes are positioned within the duct; and
   a second fluid circuit fluidly coupled to the cooking vessel, the second fluid circuit including:
      left headers positioned on a left side of the duct;
      right headers positioned on a right side of the duct;
      rightward tubes fluidly coupled to the left headers and the right headers, wherein the rightward tubes are downstream from the left headers; and
      leftward tubes fluidly coupled to the right headers and the left headers, wherein the leftward tubes are downstream from the right headers.

4. The cooking system of claim 3, wherein the first fluid circuit further comprises a first inlet fluidly coupled to a top header, wherein the first inlet is fluidly coupled to the cooking vessel, wherein the cooking vessel contains a cooking fluid.

5. The cooking system of claim 3, wherein the first fluid circuit further comprises a first inlet fluidly coupled to a bottom header, wherein the first inlet is fluidly coupled to the cooking vessel, wherein the cooking vessel contains a cooking fluid.

6. The cooking system of claim 3, wherein the first fluid circuit further comprises a first outlet fluidly coupled to a top header, wherein the first outlet is fluidly coupled to the cooking vessel, wherein the cooking vessel contains a cooking fluid.

7. The cooking system of claim 3, wherein the first fluid circuit further comprises a first outlet fluidly coupled to a bottom header, wherein the first outlet is fluidly coupled to the cooking vessel, wherein the cooking vessel contains a cooking fluid.

8. The cooking system of claim 3, wherein the second fluid circuit further comprises a second inlet fluidly coupled to a left header, wherein the second inlet is fluidly coupled to the cooking vessel, wherein the cooking vessel contains a cooking fluid.

9. The cooking system of claim 3, wherein the second fluid circuit further comprises a second inlet fluidly coupled to a right header, wherein the second inlet is fluidly coupled to the cooking vessel, wherein the cooking vessel contains a cooking fluid.

10. The cooking system of claim 3, wherein the second fluid circuit further comprises a second outlet fluidly coupled to a left header, wherein the second outlet is fluidly coupled to the cooking vessel, wherein the cooking vessel contains a cooking fluid.

11. The cooking system of claim 3, wherein the second fluid circuit further comprises a second outlet fluidly coupled to a right header, wherein the second outlet is fluidly coupled to the cooking vessel, wherein the cooking vessel contains a cooking fluid.

12. The cooking system of claim 1, wherein each of the holes extend horizontally, relative to a vertical direction of the first flow path, directly from the first bore into the third bore.

13. The cooking system of claim 1, wherein the third bore extends circumferentially, with respect to a central axis, about an entirety of the second bore.

14. The cooking system of claim 1, wherein a lower end of the third bore extends circumferentially, with respect to a central axis, about an entirety of the second bore and below an upper end of the second bore.

15. The cooking system of claim 1, wherein the first flow path is configured to emit an air/fuel mixture into the combustion chamber at the first flow rate, the first flow path extends from the first bore, through the second bore, and into the third bore, and the plurality of second flow paths is configured to emit an air/fuel mixture into the combustion chamber at the second flow rate that is less than the first flow rate, the plurality of second flow paths extend from the first bore, through the plurality of holes, and into the third bore.

16. A cooking system including a burner assembly, the burner assembly comprising:
a plurality of first burners, each including a first bore, a second bore, and a third bore that are concentrically aligned,
wherein for each first burner:
the first bore includes a plurality of holes disposed along a circumference of the first bore,
each hole extends directly into the third bore, and
the third bore includes a combustion chamber,
wherein each first burner comprises a first flow path configured to emit fuel or an air/fuel mixture into the combustion chamber at a first flow rate, the first flow path extends from the first bore, through the second bore, and into the third bore, and a plurality of second flow paths configured to emit fuel or an air/fuel mixture into the combustion chamber at a second flow rate that is less than the first flow rate, the plurality of second flow paths extend from the first bore, through the plurality of holes, and into the third bore; and
a plurality of second burners provided adjacent the plurality of first burners, wherein the plurality of second burners are ribbon burners.

17. The cooking system of claim 16, further comprising:
a heat exchanger configured to receive a combusted fuel and/or a combusted air/fuel mixture from the burner assembly, the heat exchanger including a duct that is configured to receive the combusted fuel and/or the combusted air/fuel mixture from the burner assembly.

18. The cooking system of claim 17, further comprising a cooking vessel fluidly coupled to the heat exchanger.

19. A cooking system including a burner assembly, the burner assembly comprising:
a plurality of first burners, each including a first bore, a second bore, and a third bore that are concentrically aligned,
wherein for each first burner:
the first bore includes a plurality of holes disposed along a circumference of the first bore,
each hole extends directly into the third bore, and
the third bore includes a combustion chamber,
wherein each first burner comprises a first flow path configured to emit fuel or an air/fuel mixture into the combustion chamber at a first flow rate, the first flow path extends from the first bore, through the second bore, and into the third bore, and a plurality of second flow paths configured to emit fuel or an air/fuel mixture into the combustion chamber at a second flow rate that is less than the first flow rate, the plurality of second flow paths extend from the first bore, through the plurality of holes, and into the third bore;
a first ribbon burner provided adjacent a first side of the plurality of first burners; and
a second ribbon burner disposed adjacent a second side of the plurality of first burners.

20. The cooking system of claim 19, further comprising:
a heat exchanger configured to receive a combusted fuel and/or a combusted air/fuel mixture from the burner assembly, the heat exchanger including a duct that is configured to receive the combusted fuel and/or the combusted air/fuel mixture from the burner assembly; and
a cooking vessel fluidly coupled to the heat exchanger.

* * * * *